United States Patent
Sorenson, III

(10) Patent No.: US 10,180,953 B2
(45) Date of Patent: Jan. 15, 2019

(54) RECEIVER-SIDE DATA DEDUPLICATION IN DATA SYSTEMS

(71) Applicant: Amazon Technologies, Inc., Seattle, WA (US)

(72) Inventor: James Christopher Sorenson, III, Seattle, WA (US)

(73) Assignee: Amazon Technologies Inc., Seattle, WA (US)

(*) Notice: Subject to any disclaimer, the term of this patent is extended or adjusted under 35 U.S.C. 154(b) by 384 days.

(21) Appl. No.: 14/605,843

(22) Filed: Jan. 26, 2015

(65) Prior Publication Data

US 2015/0169665 A1    Jun. 18, 2015

Related U.S. Application Data

(63) Continuation of application No. 12/981,393, filed on Dec. 29, 2010, now Pat. No. 8,943,023.

(51) Int. Cl.
G06F 17/30 (2006.01)

(52) U.S. Cl.
CPC .. G06F 17/30345 (2013.01); G06F 17/30303 (2013.01)

(58) Field of Classification Search
CPC ................................................ G06F 17/30345
USPC ....... 707/610, 624–7, 632–7, 640, 661, 674, 707/999.204; 718/1
See application file for complete search history.

(56) References Cited

U.S. PATENT DOCUMENTS 7,200,604 B2    4/2007    Forman et al.
7,360,034 B1    4/2008    Muhlestein et al.
7,539,745 B1    5/2009    Wang et al.
7,567,188 B1    7/2009    Anglin et al.
7,761,425 B1    7/2010    Erickson et al.
7,814,074 B2    10/2010   Anglin et al.
(Continued)

FOREIGN PATENT DOCUMENTS

CN    1655129       8/2005
JP    200232400     1/2002
(Continued)

OTHER PUBLICATIONS

Office Action from Japanese Application No. 2015-095007, dated Apr. 12, 2016, pp. 1-7.
(Continued)

*Primary Examiner* — Syling Yen
(74) *Attorney, Agent, or Firm* — Robert C. Kowert; Meyertons, Hood, Kivlin, Kowert & Goetzel, P.C.

(57) ABSTRACT

Methods and apparatus for receiving uploaded data from a sender at a receiver. A data deduplication technique is described that may reduce the bandwidth used in uploading data from the sender to the receiver. In the technique, the receiver, rather than the sender, maintains a fingerprint dictionary for previously uploaded data. When a sender has additional data to be uploaded, the sender extracts fingerprints for units of the data and sends the fingerprints to the receiver. The receiver checks its fingerprint dictionary to determine the data units to be uploaded and notifies the sender of the identified units, which then sends the identified units of data to the receiver. The technique may, for example, be applied in virtualized data store systems to reduce bandwidth usage in uploading data.

20 Claims, 17 Drawing Sheets

(56) References Cited

U.S. PATENT DOCUMENTS

| | | | |
|---|---|---|---|
| 8,943,023 B2 | 1/2015 | Sorenson, III | |
| 2002/0069369 A1 | 6/2002 | Tremain | |
| 2006/0123010 A1 | 6/2006 | Landry et al. | |
| 2007/0061889 A1 | 3/2007 | Sainaney | |
| 2008/0005201 A1 | 1/2008 | Ting et al. | |
| 2009/0144422 A1 | 6/2009 | Chatley et al. | |
| 2010/0070725 A1 | 3/2010 | Prahlad et al. | |
| 2010/0094817 A1 | 4/2010 | Ben-Shaul et al. | |
| 2010/0114833 A1 | 5/2010 | Mu | |
| 2010/0138827 A1* | 6/2010 | Frank | G06F 9/45558 718/1 |
| 2010/0250896 A1 | 9/2010 | Matze | |
| 2011/0099200 A1 | 4/2011 | Blount et al. | |
| 2011/0161723 A1 | 6/2011 | Taleck et al. | |
| 2011/0218969 A1* | 9/2011 | Anglin | G06F 11/1453 707/679 |
| 2011/0246741 A1* | 10/2011 | Raymond | G06F 17/30159 711/170 |
| 2012/0035749 A1 | 2/2012 | Schleiss et al. | |
| 2012/0110328 A1* | 5/2012 | Pate | G06F 21/6218 713/165 |
| 2012/0216052 A1* | 8/2012 | Dunn | G06F 21/78 713/193 |

FOREIGN PATENT DOCUMENTS

| | | |
|---|---|---|
| JP | 20002268935 | 9/2002 |
| JP | 2008186157 | 8/2008 |
| JP | 2009508240 | 2/2009 |
| JP | 2009181648 | 8/2009 |
| JP | 201092475 | 4/2010 |
| JP | 2010250760 | 11/2010 |
| WO | 2007030920 | 3/2007 |

OTHER PUBLICATIONS

Office Action from Chinese Application No. 201180063651.X, dated Aug. 5, 2015, Amazon Technologies, Inc., pp. 1-23.

U.S. Appl. No. 14/136,624, filed Dec. 20, 2013, Marvin Michael Theimer.

Greer, D. Reducing the Storage Burden via Data Deduplication. Computer, Dec. 2008, vol. 41 Issue:12, pp. 15-17.

Austin T. Clements, Irfan Ahmad, Murali Vilayannur, Jinyuan Li. Decentralized Deduplication in SAN Cluster File Systems. Proceedings of the 2009 conference on USE NIX Annual technical conference, pp. 1-20.

U.S. Appl. No. 12/981,397, filed Dec. 29, 2010, James Christopher Sorenson.

Notification of the Second Office Action from Chinese Application No. 201180063651.X, dated Apr. 1, 2016 (English Translation and Chinese Version), pp. 1-23.

Extended European Search Report from PCT/US2011/066375, dated Dec. 13, 2016, Amazon Technologies, Inc., pp. 1-7.

Office Action from Japanese Patent Application No. 2015-095007, dated Mar. 28, 2017 (English translation and Japanese version), pp. 1-9.

* cited by examiner

RECEIVER-SIDE DATA DEDUPLICATION IN DATA SYSTEMS

This application is a continuation of U.S. patent application Ser. No. 12/981,393, filed Dec. 29, 2010, now U.S. Pat. No. 8,943,023, which is hereby incorporated by reference in its entirety.

BACKGROUND

In many data systems, broadly viewed, a sender (a data source) uploads data to a receiver (a data processor) via a communications channel. An example of such a system is a data storage system; however, these data systems may include any system in which a receiver somehow processes data uploaded from a sender. The uploaded and processed data may include, but is not limited to, any type of textual, graphical, or image data, audio data (e.g., music and voice data), video data, compressed and/or encrypted data, and so on. In many such systems, large amounts of data may need to be uploaded from the sender to the receiver via the communications channel. However, communications channels generally have bandwidth constraints, while a goal of such data systems is to get as much usable data across the communications channel to the receiver as possible.

Data deduplication refers to techniques for reducing or eliminating redundant data in such systems, for example to improve storage utilization in a data storage system and/or to reduce bandwidth usage on the communications channel. As an example, in at least some data deduplication techniques applied to data storage systems, the storage of duplicate data to a data store may be prevented. To achieve this, units of data that already reside in the data store, and/or units of data that do not reside in the data store, may be identified, and only the units that do not reside in the data store are stored or updated in the data store. Data deduplication in this application may thus reduce required storage capacity since fewer or only one copy of a particular unit of data is retained.

One technique for data deduplication in data systems is to have the sender upload all data to be processed (e.g. stored, in a data storage system) at the receiver, and have the receiver identify units of data that are to be processed. However, this technique does not reduce bandwidth usage between the sender and the receiver.

A conventional technique for data deduplication that may reduce bandwidth usage is to have the sender identify units of data to upload to the receiver; only the identified units of data are uploaded from the sender to the receiver. FIG. 1 illustrates a conventional deduplication technique in which a sender (a data source) identifies and uploads units of data to a receiver (e.g., a data storage system). In this conventional deduplication technique, the sender 20 maintains data 22 and locally stored fingerprints 24. Locally stored fingerprints 24 may uniquely identify units of data 22 that have been uploaded to data store 12. A fingerprint 24 may, for example, be a hash of a unit of data 22. In block-based data systems (for example, block storage systems), a unit of data may, for example, be a 256 k-byte portion of a data block, a 1024 k-byte portion of a data block, or some other fixed or variable sized portion of a data block. In file-based systems, a unit of data may be a file, or a portion of a file similar to the portions in a block-based data system. When sender 20 has data 22 to be uploaded to receiver 10, a data upload manager 26 at sender 20 may extract fingerprint(s) for units of the data 22 to be uploaded and compare the extracted fingerprint(s) to locally stored fingerprints 24 to identify one or more units of data that have not been uploaded to receiver 10 (or that have previously been uploaded, but have since been modified locally). The data upload manger 26 may then upload the identified data unit(s) to receiver 10, which processes 12 the data unit(s), for example by storing the data units to a data store.

While this technique may reduce the bandwidth used in uploading data from the sender 20 to the receiver 10, the technique requires the sender 20 to maintain a dictionary of fingerprints 24. In many such systems, a local store or cache of data 22 maintained locally at sender 20 may include many gigabytes or terabytes of data. Thus, the dictionary of fingerprints 24 that must be maintained by sender 20 may be quite large. In addition, in some systems, a receiver 10 may serve multiple senders 20, and in these systems it is difficult to apply deduplication globally (e.g., to consistently apply deduplication across data stored by the receiver 10 for two or more data sources).

Figure 1:
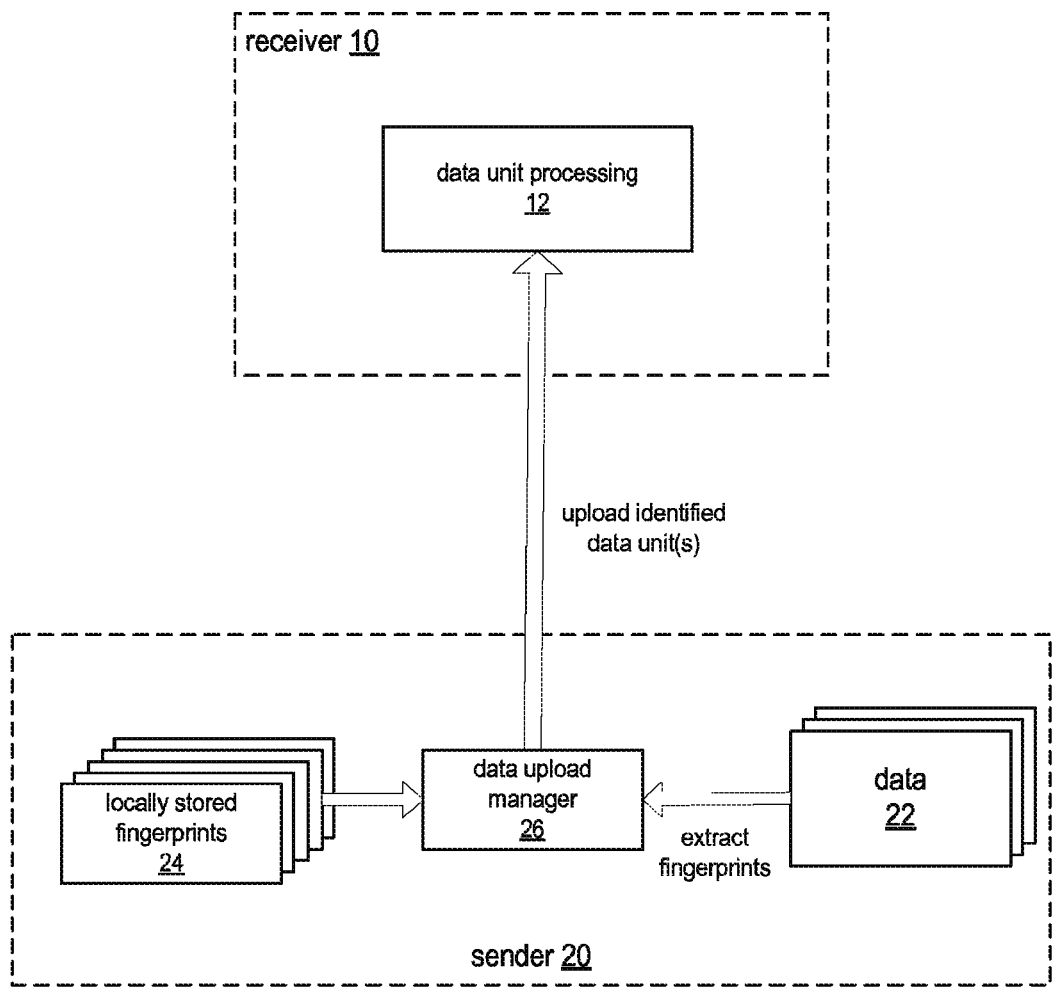
FIG. 1 illustrates a conventional deduplication technique in which a sender (a data source) identifies and uploads units of data to a receiver (e.g., a data storage system).

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for receiver-side data deduplication are described. Embodiments of a data deduplication technique are described that may, for example, be applied in virtualized data store systems to reduce bandwidth usage on the communications channel between the sender and the receiver when compared to conventional data deduplication techniques. In embodiments of the data deduplication technique, rather than the sender maintaining a fingerprint dictionary and determining data units to be uploaded to the receiver, the receiver maintains the fingerprint dictionary. When a sender has data to be uploaded, the sender extracts fingerprints for the data and sends the fingerprints to the receiver. The receiver checks its fingerprint dictionary to determine the data units to be uploaded to the receiver and notifies the sender, which then sends the identified units of data to the receiver. Embodiments of the data deduplication technique thus reduce the bandwidth used in uploading data from the sender to the receiver as only the units that are not present in the data store are uploaded. In addition, embodiments remove the requirement for the sender to maintain a large fingerprint dictionary and centralize data deduplication at the receiver, thus allowing data deduplication to be applied across data stored for multiple data sources. A small tradeoff may be made in that latency in the upload process may be increased as the technique requires an extra round of communication between the sender and the receiver; however, latency is generally not a primary concern in the upload process.

While embodiments of the data deduplication technique are generally described herein in data storage system applications, the data deduplication technique may be applied in any system in which a receiver receives data uploaded from a sender. The uploaded and processed data may include, but is not limited to, any type of textual, graphical, or image data, audio data (e.g., music or voice data), video data, compressed and/or encrypted data, and so on. In addition, while embodiments are generally described herein in terms of a sender and a receiver that are remotely located and communicate via a wired and/or wireless network such as the Internet, the data deduplication technique may also be applied in applications where the sender and receiver are local devices that communicate, for example, via a wired or wireless local network or direct link, as well as applications where the sender and receiver are hardware and/or software components within a single device or system that communicate via an internal communications channel such as a data bus, direct data link, shared memory transfer, or wireless communications channel.

Figure 2A:
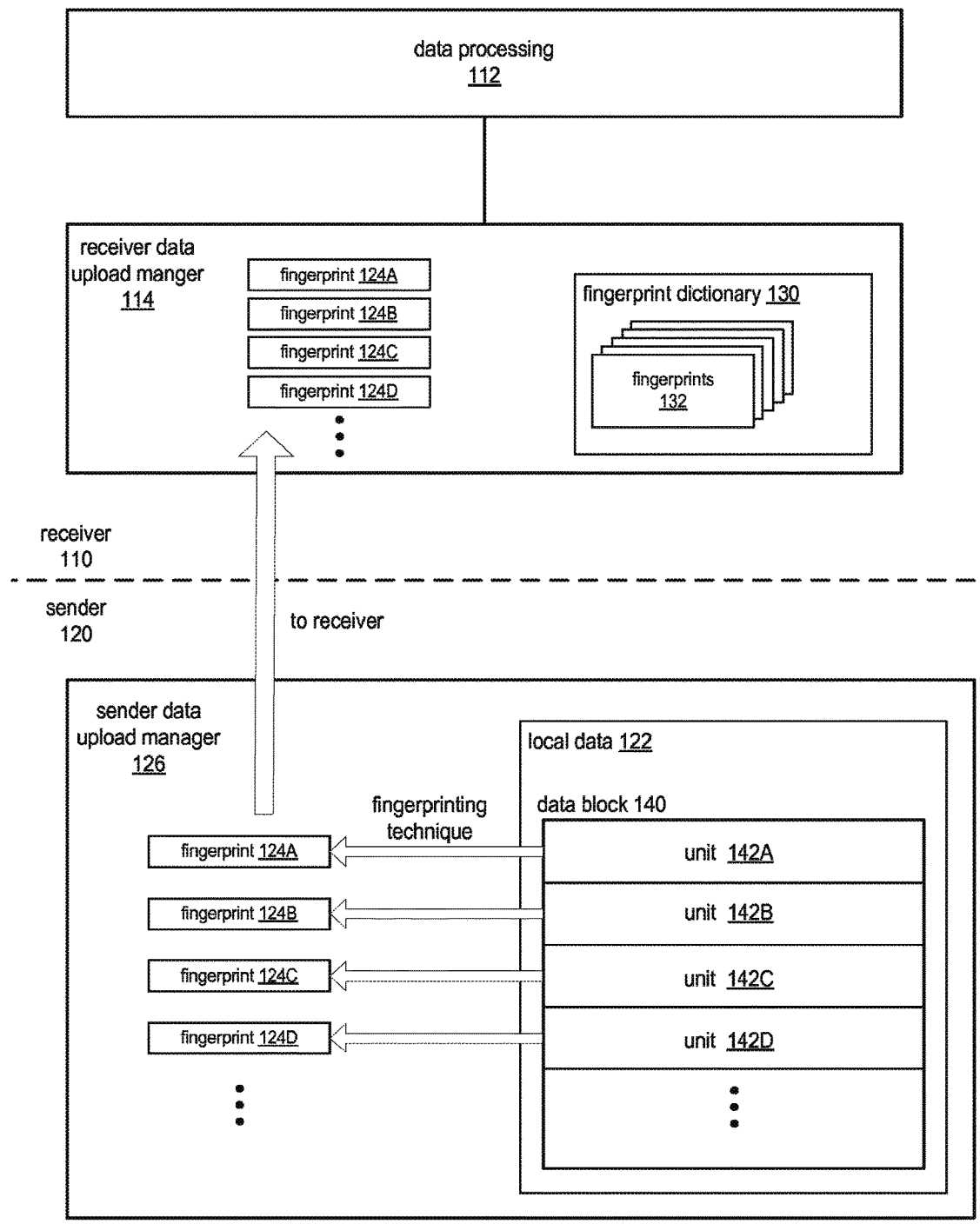
FIGS. 2A through 2D are block diagrams illustrating the data deduplication technique implemented in a data system including a sender (data source) and a receiver (a data storage system), according to at least some embodiments.

FIGS. 2A through 2D are block diagrams illustrating the data deduplication technique implemented in a data system including a sender (data source) and a receiver (e.g., a data storage system), according to at least some embodiments. Referring to FIG. 2A, the receiver 110 may process data according to a data processing 112 technique or function. For example, the receiver 110 may store data in a data store. FIG. 2A shows a single sender 120; however, there may be more than one sender 120. Sender 120 may, for example, correspond to a single system such as a server, a collection of systems such as a server cluster, or a data center, but in general sender 120 may correspond to any device or system that may upload data to a receiver 110. Receiver 110 may implement a receiver data upload manager 114. Receiver data upload manager 114 may be implemented in hardware, software, or a combination thereof. Receiver data upload manager 114 may provide an interface, for example a web services interface or an API, via which a sender 120 may access functionality provided by the receiver 110.

Receiver data upload manager 114 may store and manage fingerprints 132 for data, for example for data stored in a data store, in a fingerprint dictionary 130. In at least some embodiments, a fingerprint 132 may be a hash of a unit of data. In block-based data systems (also referred to as block storage systems), a unit of data may, for example, be a 256 k-byte portion of a data block, a 1024 k-byte portion of a data block, or some other fixed or variable sized portion of a data block. In file-based systems, a unit of data may be a file, or a portion of a file similar to the portions in a block-based data system. In at least some embodiments, a fingerprint 132 may be any type of cryptographically strong one-way hash function, for example a Secure Hash Algorithm (SHA)-256 hash function. The use of a cryptographically strong one-way hash function provides security, and helps to avoid collisions, as collisions using such a hash function are highly unlikely. A collision is when two units of data produce the same fingerprint.

Fingerprint dictionary 130 may reside on a single system, or may be distributed across two or more systems, for example two or more server systems. In some embodiments, fingerprint dictionary 130 may be implemented and maintained as a consistent hash dictionary spread across two or more servers. In at least some embodiments, fingerprint dictionary 130 may be a fixed size dictionary.

In at least some embodiments, receiver data upload manager 114 may maintain fingerprints 132 for multiple customers in a single fingerprint dictionary 130. A customer is the "owner" of a particular collection of data, and may be an individual, an enterprise, or a division, department, office, or other entity within an enterprise. In some embodiments, each customer may be assigned a unique customer identifier that may be appended to, or otherwise associated with, fingerprints 132 for the respective customer's data. Alternatively, receiver data upload manager 114 may maintain a separate fingerprint dictionary 130 for each customer.

Sender data upload manager 126 may act as an interface between sender 120 and receiver data upload manager 114. Sender data upload manager 126 may be implemented in hardware, software, or a combination thereof. The communications channel(s) between sender data upload manager 126 and receiver data upload manager 114 may be a relatively high-bandwidth connection or communications channel, as large amounts of data may need to be transferred across the network (e.g., the Internet) between sender data upload manager 126 and receiver data upload manager 114.

Sender 120 may locally cache, store, or obtain at least some data, while receiver 110 may be a primary store or destination for the data. For example, to improve data access times for users, rather than retrieving data from a data store maintained by receiver 110 on demand, large blocks or chunks of data, even entire volumes of data, may be locally cached or stored at sender 120 as local data 122. Sender 120 may include physical data storage and/or memory on which local data 122 may be cached or stored. However, the data store maintained by receiver 110 may serve as the primary data store for the customer; thus, sender data upload manager 126 communicates with receiver data upload manager 114 to periodically, aperiodically, or continuously upload new or modified data in local data 122 to the data store.

Sender data upload manager 126 may, in at least some embodiments, maintain local data 122 in relatively large blocks, e.g. 4 megabyte blocks or 10 megabyte blocks, although larger or smaller block sizes may be used. When a block of data 140 is accessed by a user or process, e.g. to create new data or modify existing data, the block may be marked as "dirty." However, the access may have changed only a small portion of the block. Thus, as shown in FIG. 2A, the sender data upload manager 126 may generate fingerprints 124 for units of the dirty block 140, for example by applying a hash function to each unit. In block-based data systems (for example, block storage systems), a unit of data may, for example, be a 256 k-byte portion of a data block, a 1024 k-byte portion of a data block, or some other fixed or variable sized portion of a data block. (In file-based systems, a unit of data may be a file, or a portion of a file similar to the portions in a block-based data system.) As shown in FIG. 2A, the sender data upload manager 126 may send the fingerprints 124 that were generated for the dirty block 140 to the receiver data upload manager 114.

Figure 2B:
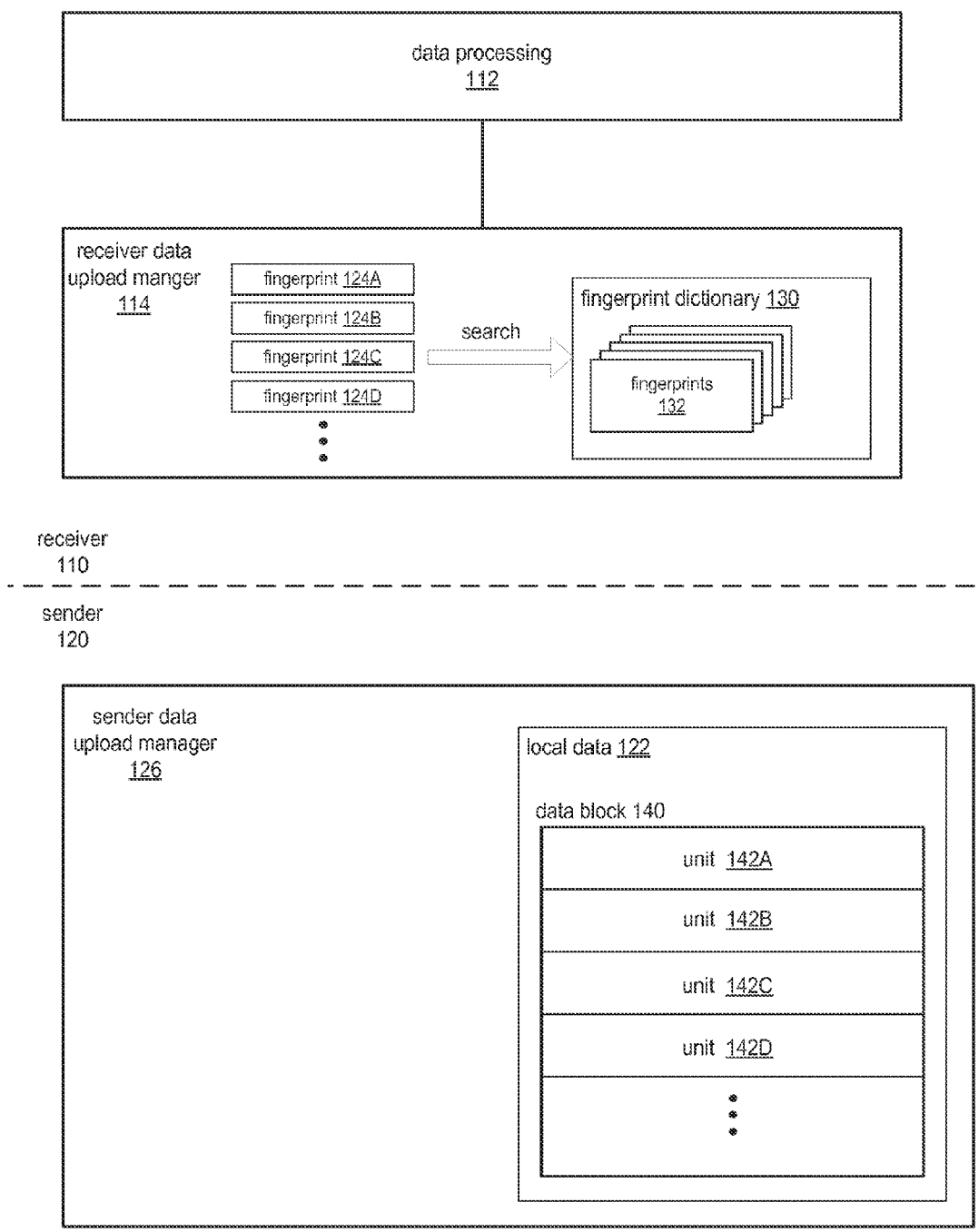

In FIG. 2B, the receiver data upload manager 114 may search the fingerprint dictionary 130 for matches to the fingerprints 124 received from the sender data upload manager 126. The search may be performed according to a search function implemented or accessed by receiver data upload manager 114; one of ordinary skill in the art will recognize that any of a variety of search techniques may be used. As previously mentioned, in some embodiments, a unique identifier for the respective customer may be used to distinguish these fingerprints 124 from those of other customers to avoid collisions, either by searching a fingerprint dictionary specific to the respective customer or by searching a common fingerprint dictionary for all customers for fingerprints that are indicated, by the unique identifier, as belonging to the respective customer. Fingerprints 124 that are found in the fingerprint dictionary 130 do not need to be uploaded, as their presence in the dictionary 130 indicates that the corresponding unit of data exists at receiver 110 (for example, the unit of data is stored in a data store). Fingerprints 124 that are not found in the fingerprint dictionary 130 do need to be uploaded, as their absence from the dictionary 130 indicates that the corresponding unit of data does not exist at receiver 110 (for example, the unit of data is not stored in the data store) or that the corresponding unit of data has been changed at the sender 120 and needs to be replaced or updated.

Note that if the entire block of data for which the fingerprints 124 were generated is a newly created block of data, it may be the case that none of the fingerprints 124 will be found in the fingerprint dictionary 130, and thus all of the corresponding units need to be uploaded to the receiver 110. However, some, or all, of the fingerprints 124 may be found in the fingerprint dictionary 130 if the same units of data exist in other previously uploaded blocks for the customer, and thus at least some of the corresponding units may not need to be uploaded to the receiver 110. In other words, two or more blocks of data may share at least some common units at the receiver 110, for example in a data store.

Figure 2C:
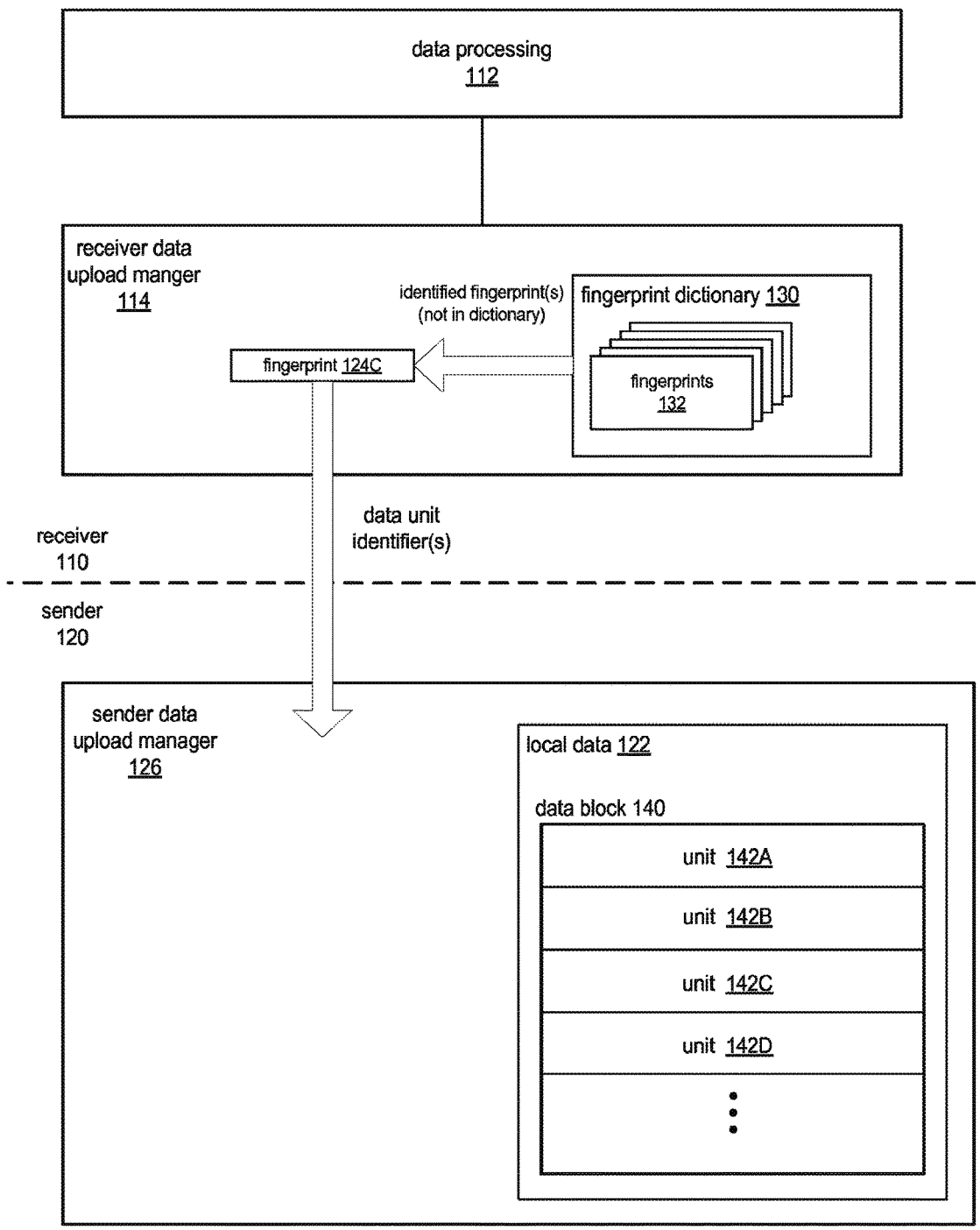

In the example shown in FIG. 2C, fingerprint 124C has been identified as corresponding to a unit of data that needs to be uploaded (i.e., fingerprint 124C was not located in fingerprint dictionary 130). Receiver data upload manager 114 may then send a data unit identifier for the data unit corresponding to fingerprint 124C (i.e., data unit 142C) to the sender data upload manager 126. In some embodiments, the data unit identifier(s) may be the respective fingerprint(s), in this example fingerprint 124C. Other methods may be used to identify data units that need to be uploaded; for example, a block number/unit number indexing scheme may be used to identify data units that need to be uploaded in some embodiments, or a bit field scheme may be used in which one or more bits in a "bit map" are set to indicate either data units that need to be uploaded or data units that do not need to be uploaded. In some embodiments, the data unit identifier(s) sent to sender data upload manager 126 by receiver data upload manager 114 may indicate the data unit(s) that do not need to uploaded, rather than the data unit(s) that do need to be uploaded. In some embodiments, to reduce bandwidth usage, receiver data upload manager 114 may send data unit identifier(s) that indicate either the set of data unit(s) that do not need to uploaded or the set of data unit(s) that do need to be uploaded, depending on which set is the smallest. Information may be included, for example in a header, that indicates whether the identifier(s) sent to sender data upload manager 126 are for data unit(s) that do or that do not need to be uploaded.

Figure 2D:
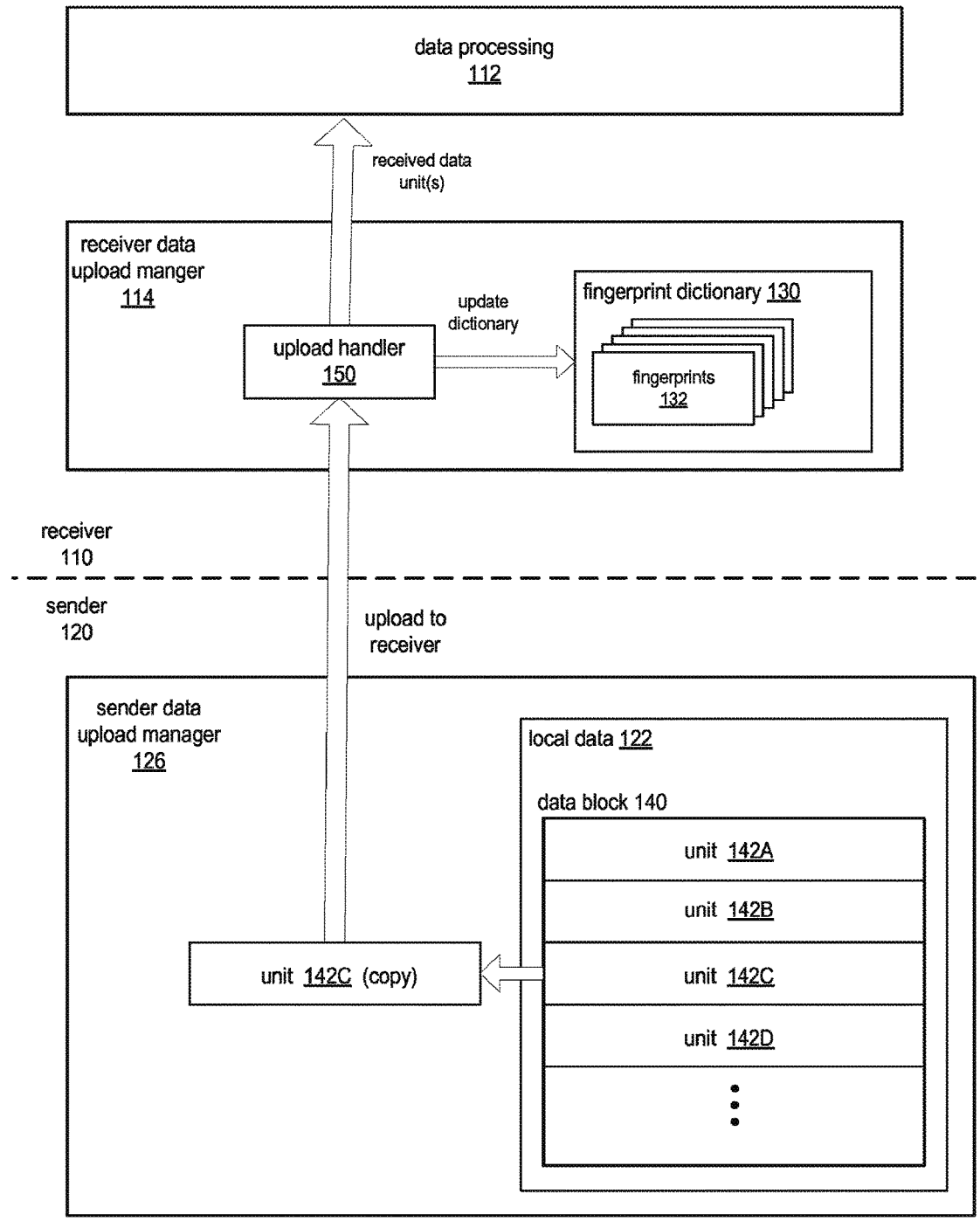

In FIG. 2D, the identified data unit 142C is uploaded by sender data upload manager 126 to receiver data upload manager 114. Note that only the identified data unit(s) from a dirty block are uploaded; the entire block is not uploaded, unless it is the case that all of the data units of the block have been identified by the receiver data upload manager 114 as needing to be uploaded. FIG. 2D shows an upload handler or process 150 of receiver data upload manager 114 that receives uploaded data unit(s) and forwards the received data units(s) to a data processing 112 function for further processing. For example, in a data storage system, data processing 112 function may store the uploaded data unit 142C to a data store. In a data storage system, the data processing 112 function may add an uploaded data unit as a new data unit in the data store, or may replace or update an existing data unit in the data store with an uploaded data unit.

In some embodiments, identified data units may be compressed by sender data upload manager 126 before uploading the data units to receiver data upload manager 114 to further reduce bandwidth usage on the communications channel. In some embodiments, sender data upload manager 126 may determine if the compressed version of a given data unit is smaller than the uncompressed version by some threshold amount or percentage, and upload the compressed version if it is, or the uncompressed version if it is not. Compressed data units received at the sender data upload manager 126 may be, but are not necessarily, decompressed before processing 112.

As previously noted, in at least some embodiments, fingerprint dictionary 130 may be a fixed size dictionary. Thus, in some embodiments, fingerprint dictionary 130 may not have room to store fingerprints 132 corresponding to all data units that have been received by receiver 110. For example, in a data storage system, fingerprint dictionary 130 may not store fingerprints 132 for all data units stored in the data store. Thus, in these embodiments, receiver 110 may implement one or more dictionary maintenance functions that, periodically or as necessary, purge, delete, or replace fingerprints 132, for example stale or least recently used (LRU) fingerprints 132. Thus, it is possible that one or more of the fingerprints that the receiver data upload manager 114 determines are in the dictionary 130 in response to receiving the fingerprints 124 from sender 120 get purged by a dictionary maintenance function before the exchange between sender 120 and receiver 110 in the data deduplication technique is completed. Thus, in some embodiments, after receiving data unit(s) from sender data upload manager 126 as shown in FIG. 2D, receiver data upload manager 114 may check the received data unit(s) against the fingerprint dictionary 130 to determine if any data units are missing—that is, to determine if any fingerprints 124 that receiver data upload manager 114 initially determined were in the dictionary 130 (see FIGS. 2B and 2C) are no longer in the dictionary 130, and thus the corresponding data units are needed to complete the transaction. In some embodiment, if receiver data upload manager 114 determines that additional data units are needed to complete the transaction, the transaction may be restarted—that is, receiver data upload manager 114 may request a new list of fingerprints 124 from sender data upload manager 126. However, since both receiver data upload manager 114 and sender data upload manager 126 already have state information for the transaction, in some embodiments, this state information may be leveraged to save bandwidth. In these embodiments, receiver data upload manager 114 may, as an additional step in the transaction, send data unit identifier(s) to sender data upload manager 126 to request only the data units that are missing; that is, only the data units for which the fingerprints 132 were purged during the transaction.

The process described above in reference to the data system of FIGS. 2A through 2D may be a continuing process. That is, sender 120 may continue to check dirty blocks of data, generate fingerprints for the data units in the blocks, send the fingerprints to receiver 110, receive back indications of units of data to be uploaded, and upload the indicated units of data to receiver 110. Receiver 110 maintains the fingerprint dictionary 130 to reflect the current state of data at the receiver 110, and forwards the received data unit(s) to a data processing function 112 which, for example, stores or updates data blocks in a data store according to the data units received from sender(s) 120.

Embodiments of the data deduplication technique may be applied in any data system that includes a sender (data source) and receiver (data store) as generally described to reduce upload bandwidth usage while moving the data deduplication tasks of maintaining a fingerprint dictionary and checking the dictionary to determine units of data to be uploaded from the sender to the receiver, including but not limited to any data storage system. However, embodiments of the data deduplication technique are described herein in the context of a virtualized data store system that includes a virtualized data store provider that provides, over a network such as the Internet, a virtualized data store to one or more virtual data store clients. The following section describes embodiments of a virtualized data store system, including embodiments that provide a virtualized data store service on the provider side and a virtualized data store gateway on the client side. The section also describes embodiments of a virtualized service provider that provides a hardware virtualization service, as well as a virtualized data store service, to customers.

Virtualized Data Store Systems

Figure 3A:
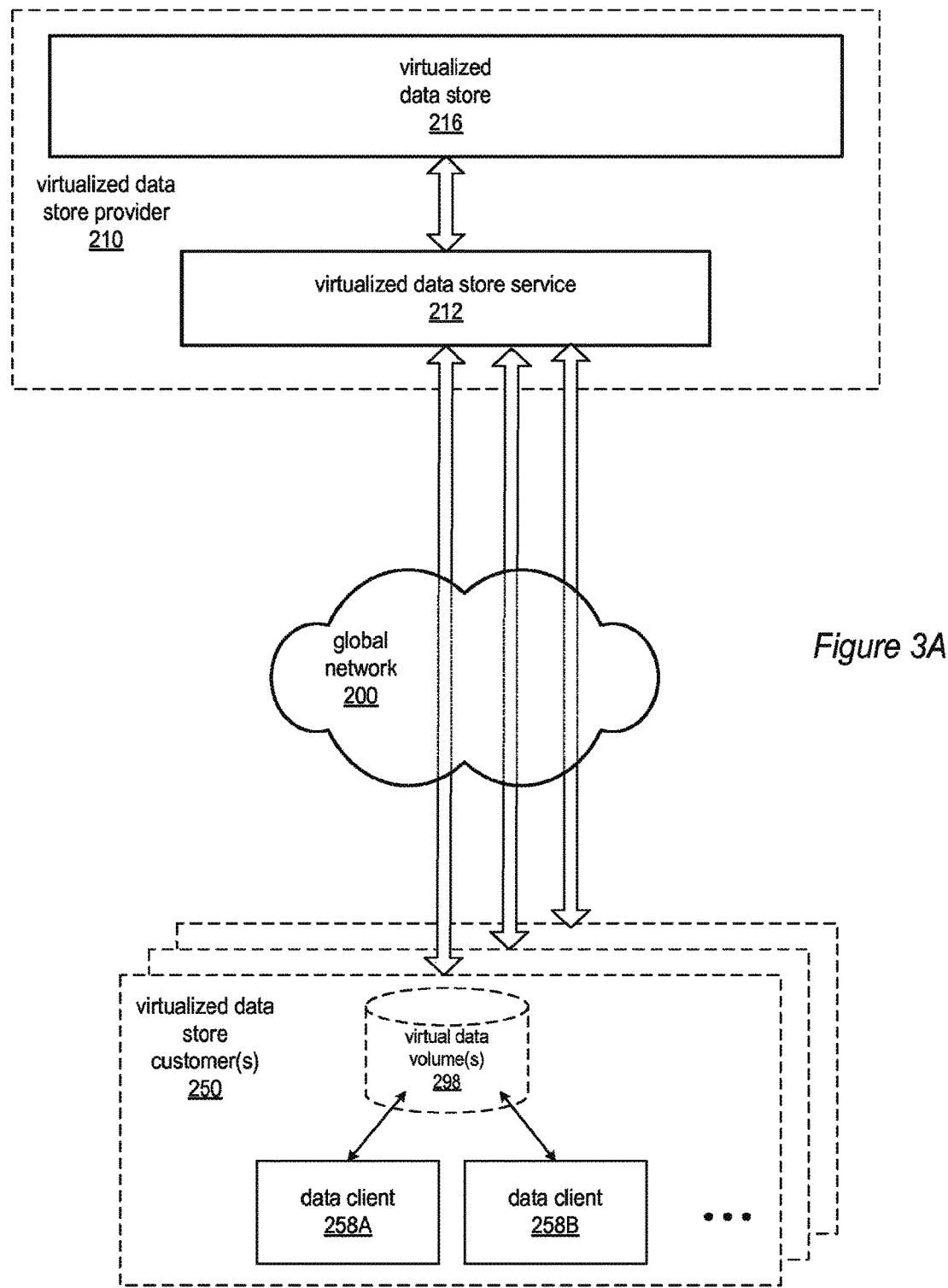
FIG. 3A is a high-level block diagram of a virtualized data store system, according to at least some embodiments.
Figure 3B:
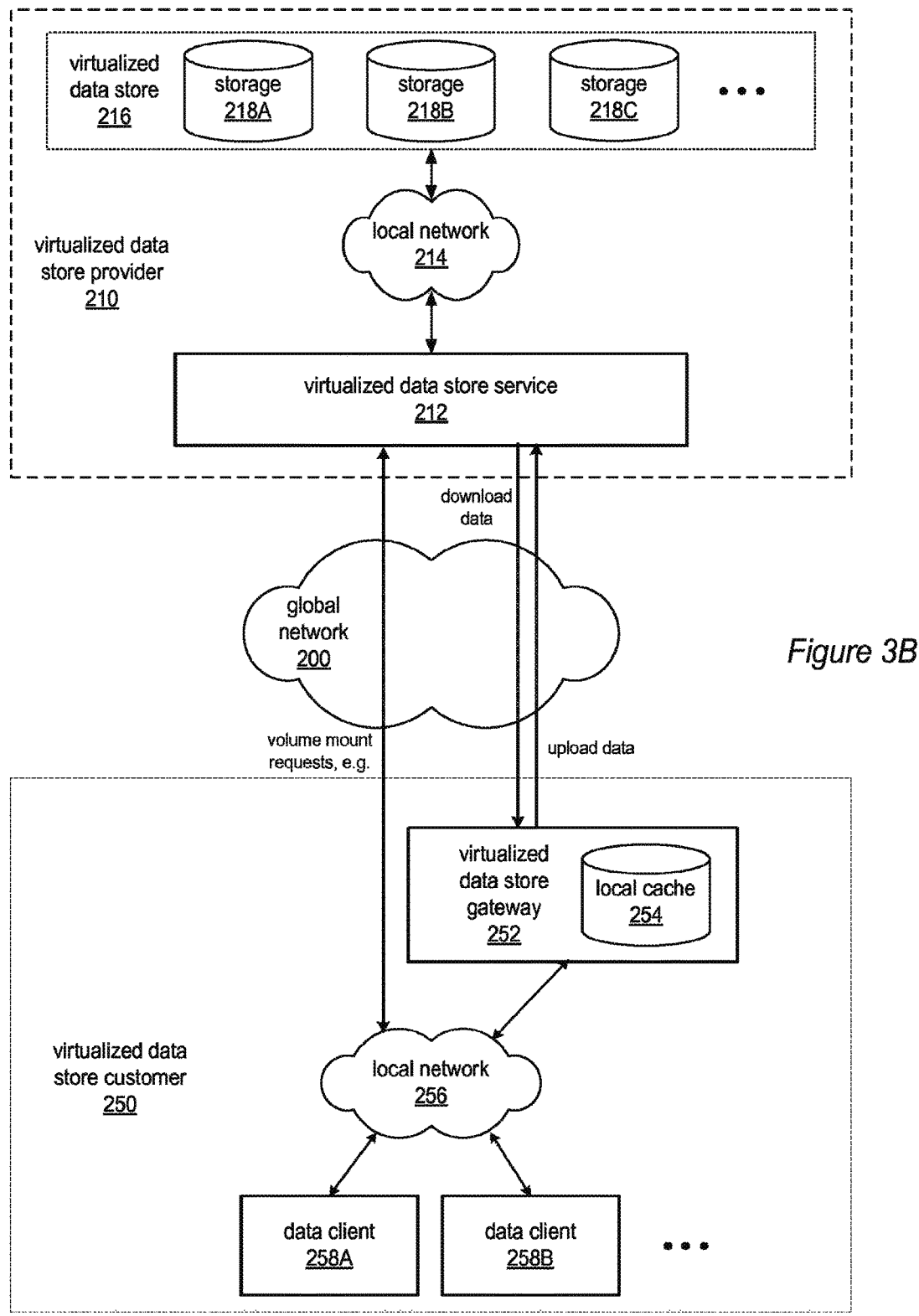
FIG. 3B is a block diagram of a virtualized data store system that includes a virtualized data store gateway at a virtualized data store customer site that serves as an interface between the virtualized data store customer and a virtualized data store service, according to at least some embodiments.
Figure 3C:
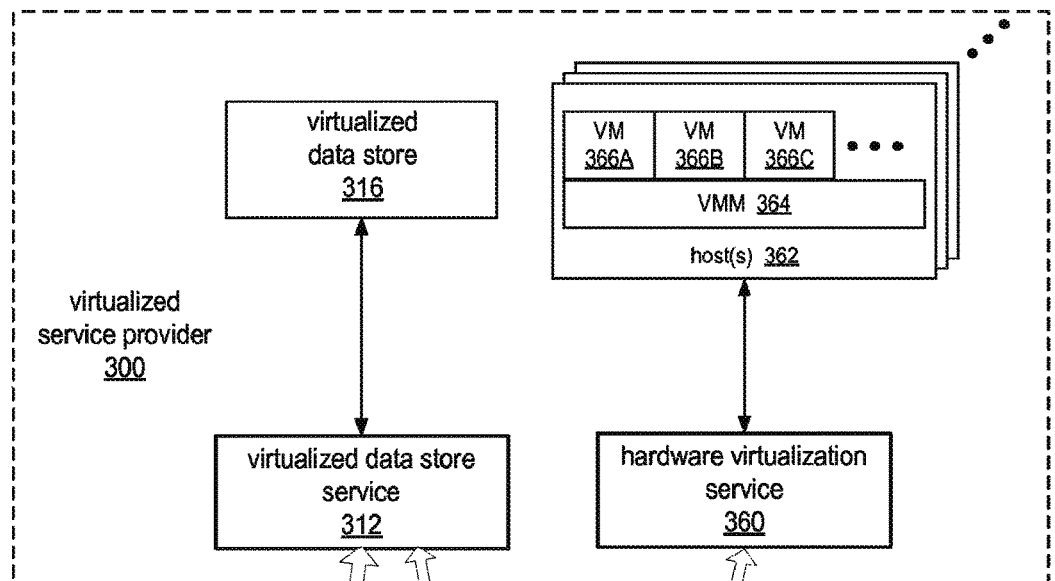
FIG. 3C is a block diagram of a virtualized service that provides a virtualized data store service and a hardware virtualization service to customers of a virtualized service provider, according to at least some embodiments.
Figure 3C:
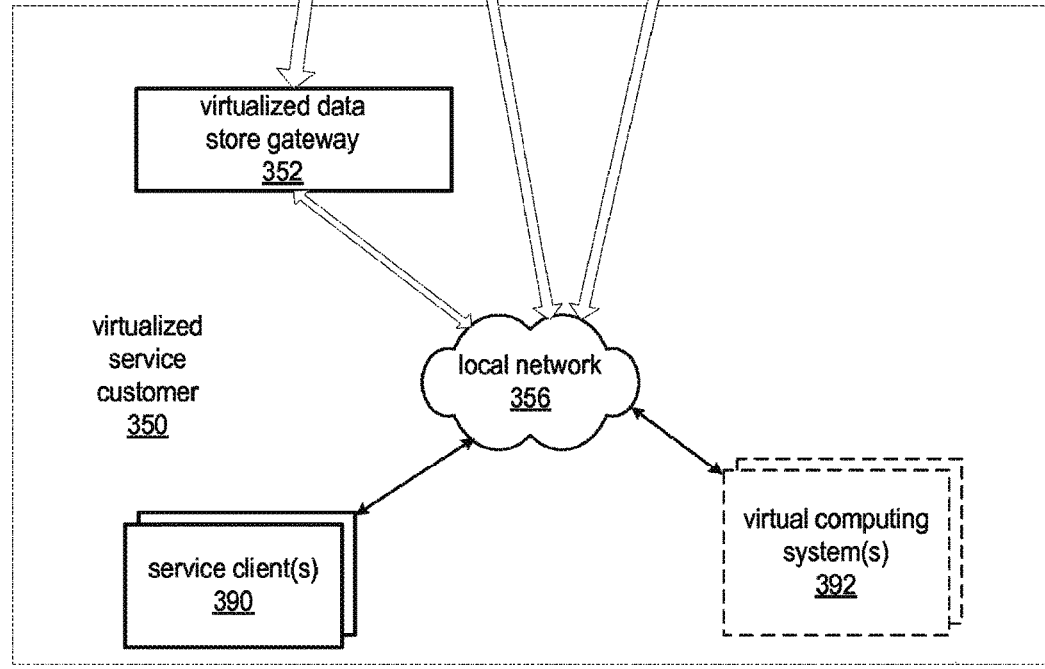

FIGS. 3A through 3C illustrate example virtualized data store systems in which the data deduplication technique may be implemented, according to at least some embodiments. FIG. 3A is a high-level block diagram of a virtualized data store system, according to at least some embodiments. A virtualized data store provider 210 on a global network 200 (e.g., the Internet) may provide one or more virtualized data store customers 250, also coupled to global network 200, access to a virtualized data store 216 via a virtualized data store service 212. Each virtualized data store customer 250 may correspond to a different entity, or two or more virtualized data store customers 250 may correspond to different data centers or localities of the same entity, for example different regional offices of a business enterprise or different campuses of a school system. An entity may be a business enterprise, an educational entity, a government entity, or in general any entity that implements a computer network or networks, coupled to a global network 200 such as the Internet, to provide networked computing services to users. In some embodiments, virtualized data store service 212 may provide an interface, for example a web services interface, via which a virtualized data store customer 250 may access functionality provided by the service 212.

Data clients 254 represent physical and/or virtual machines or systems connected to the local network of a virtualized data store customer 250. A user, via a data client 254, may create and mount data volumes in virtualized data store 216 via virtualized data store service 212. From the perspective of users on virtualized data store customer 250, the data volumes provided by virtualized data store service 212 appear as if they are local storage; hence, such a data volume may be referred to as a virtual data volume 298. A virtual data volume 298 actually maps to one or more physical storage devices or storage systems on which virtualized data store 216 is instantiated; however, this mapping is handled by the virtualized data store service 212, and is thus transparent from the perspective virtualized data store customer 250. The user on the data client 254 may simply see a volume mounted on the desktop or in a device listing. The user on the data client 254 may create data, modify data, delete data, and in generally perform any data-related function on virtual data volume 298, just as if the volume 298 was implemented on a locally attached storage device.

Virtualized data store customer 250 may communicate with virtualized data store service 212 via global network 200 to upload data to and download data from virtualized data store 216. FIG. 3B is a block diagram of a virtualized data store system that includes a virtualized data store gateway 252 at virtualized data store customer 250 that serves as an interface between virtualized data store customer 250 and virtualized data store service 212, according to at least some embodiments.

In at least some embodiments, virtualized data store gateway 252 may be a file and block storage appliance that is installed on-site at a virtualized data store customer's data center. Virtualized data store gateway 252 stores a local cache 254 of frequently accessed data, while securely encrypting and accelerating data movement back to virtualized data store provider 210. This accelerated data movement, as compared to a standard Internet connection, may be achieved using data deduplication, compression, parallelization, and TCP window scaling. Virtualized data store gateway 252 may significantly reduce the cost, utilization, maintenance, and provisioning headaches that are typically associated with managing on-site storage arrays. Virtualized data store gateway 252 may accomplish this by replacing the 100s of terabytes to petabytes of data a customer may otherwise store in-house on expensive NAS and SAN hardware with a cost-effective appliance. With the virtualized data store gateway 252, customers may benefit from the low access latencies of on-site storage (provided by the local cache 254 provided by the gateway 252) while leveraging the durable, available, and scalable cloud storage infrastructure provided by the virtualized data store provider 210.

Embodiments of the virtualized data store gateway 252 may work seamlessly with customers' on-site applications. In at least some embodiments, customers may configure the virtualized data store gateway 252 to support SAN (iSCSI), NAS (NFS, Microsoft® CIFS), or Object (REST) storage. In at least some embodiments, an iSCSI interface provided by the virtualized data store gateway 252 enables integration with on-site block storage applications such as Microsoft® SharePoint®. In at least some embodiments, customers may utilize NFS and CIFS interfaces provided by the virtualized data store gateway 252 to consolidate file storage across environments including, but not limited to, Windows, Linux, and UNIX environments. In at least some embodiments, the virtualized data store gateway 252 may also be configured to support REST-based requests.

Virtualized data store gateway 252 may be implemented in hardware, software, or a combination thereof. Some embodiments of virtualized data store gateway 252 may be implemented as a dedicated device or appliance that couples to a local network 256 of virtualized data store customer 250 and also couples to global network 200 (e.g., the Internet); the device or appliance may include software and/or hardware that performs various functionality of the gateway 252. Alternatively, virtualized data store gateway 252 may be implemented as a virtual device or appliance on one or more server systems at the virtualized data store customer 250 data center.

The coupling of virtualized data store gateway 252 to global network 200 will generally be via a high-bandwidth connection provided by the virtualized data store customer 250, as large amounts of data may be transferred across global network 200 between virtualized data store service 212 and virtualized data store gateway 252. For example, at peak times, the connection may need to support the transfer of data at rates of 100 megabits/second (100 Mbit/s) or higher. However, the data deduplication technique described herein reduces bandwidth usage when uploading data from virtualized data store gateway 252 to virtualized data store service 212, and thus more of the connection's bandwidth may be available for other applications.

In at least some embodiments, bandwidth on a connection may be allocated to virtualized data store gateway 252, and to other customer applications, for example via a console at virtualized data store customer 250. Virtualized data store gateway 252 may continuously or nearly continuously upload mutated (new or changed) data to virtualized data store service 212 according to the data deduplication technique described herein. However, the mutation rate of data at customer 250 may vary over time; for example, during the day, the mutation rate may be higher, while at night the mutation rate may drop. Thus, at busy times when the mutation rate is high, virtualized data store gateway 252 may fall behind in uploading the mutated data if the bandwidth allocated to the virtualized data store gateway 252 is not high enough to keep up; virtualized data store gateway 252 may then catch up at less busy times when the mutation rate is not as high. In at least some embodiments, if the virtualized data store gateway 252 falls behind more than a specified threshold, the virtualized data store gateway 252 may request the allocation of additional bandwidth. In at least some embodiments, the virtualized data store gateway 252 may raise an alarm to demand more bandwidth, if necessary. At times when the virtualized data store gateway 252 has more bandwidth than necessary, for example during less busy times when the virtualized data store gateway 252 has more bandwidth than is needed to keep up with the mutation rate, the virtualized data store gateway 252 may release some bandwidth back to the customer so that the bandwidth can be used for other applications.

In some embodiments, rather than retrieving data from virtualized data store 216 on demand, large blocks or chunks of data, even entire volumes of data, may be locally cached.

Virtualized data store gateway 252 may include physical data storage and/or memory on which a local cache 254 of data, for example frequently-accessed data or critical data, may be maintained. Local cache 254 may be implemented in volatile or non-volatile storage or memory, or a combination thereof.

Maintaining a local cache 254 may generally improve data access times for users on data clients 258, since many or most data accesses can be serviced from the local cache 254, rather than retrieving the data from virtualized data store 216. However, virtualized data store 216 serves as the primary data store for the virtualized data store customer 250; thus, virtualized data store gateway 252 communicates with virtualized data store service 212 via global network 200 to periodically, aperiodically, or continuously upload new or modified data in local cache 254 to virtualized data store 216, and to download requested data from virtualized data store 216 when necessary.

In FIG. 3B, storage 218A, 218B, 218C . . . of virtualized data store 216 illustrates that the virtualized data store 216 may be implemented on or across several storage devices or systems connected to a local network 214 of virtualized data store provider 210. Thus, a virtualized data store customer 250's data may be spread across two or more physical storage devices or systems on the "back end." However, as noted in reference to FIG. 3A, from the perspective of the virtualized data store customer 250, the client's data are presented to the client as virtual volumes or storage devices.

In some embodiments, a virtualized data store system as described in reference to FIGS. 3A and 3B may be implemented as part of a general virtualized service that also provides hardware virtualization technologies and other virtualized storage technologies. The virtualized service may prolevelvrange of virtualized computing technology and virtualized storage technology, including virtualized block-level storage technology that provides virtualized block-level storage capabilities (i.e., a block-based storage system) to customers. Virtual computing environments or systems, implemented according to the hardware virtualization technology provided by the virtualized service provider, may be supported by the virtualized block-level storage technology. The virtualized block-level storage technology may provide a virtual storage system that is able to interact with virtual computing systems through standardized storage calls that render the block-level storage functionally agnostic to the structural and functional details of the volumes that it supports and to the operating systems executing on the virtual computing systems (or other systems) to which it provides storage availability.

In addition to integrating with on-site customer applications, the virtualized data store gateway 252 may also integrate with the virtualized computing technology and virtualized storage technology provided by virtualized service provider 300, providing customers with access to elastic "cloud-based" computing and storage resources. For example, customers using the virtualized data store gateway 252 for SAN storage may create consistent, point-in-time snapshots of their block storage data accessible from the virtualized block-level storage technology. These snapshots may then be processed by hardware virtualization technology applications or instances (see, e.g., virtual computing system(s) 392 in FIG. 3C) requiring the high I/O and low latency data access that the virtualized block-level storage technology provides. As another example, customers may configure the virtualized data store gateway 252 for NAS storage via NFS or CIFS file protocols, and may create point-in-time snapshots of their file data accessible from hardware virtualization technology instances.

In some embodiments, objects written using a REST-based interface provided by virtualized data store gateway 252 may be accessed directly from virtualized storage technology provided by the virtualized service provider via HTTP or other protocols, or may be distributed using integrated content delivery technology provided by the virtualized service provider. In some embodiments, customers may also utilize highly scalable, distributed infrastructure provided by the virtualized storage technology for parallelized processing of these objects on hardware virtualization technology instances.

FIG. 3C is a block diagram of a virtualized service that provides a virtualized data store service 312 and a hardware virtualization service 360 to customers 350 of a virtualized service provider 300, according to at least some embodiments. A virtualized service customer 350 data center includes a virtualized data store gateway 352 that serves as an interface between virtualized data store customer 350 and virtualized data store service 312 of virtualized service provider 300, for example as described in reference to FIG. 3B.

Hardware virtualization technology enables multiple operating systems to run concurrently on a host computer 362, i.e. as virtual machines (VMs) 366 on the host 362. The VMs 366 may, for example, be rented or leased to customers of the virtualized service provider 300 (e.g., to virtualized service customer 350). A hypervisor, or virtual machine monitor (VMM) 364, on a host 362 presents the VMs 366 on the host 362 with a virtual platform and monitors the execution of the VMs 366. Each VM 366 may be provided with one or more IP addresses; the VMM 364 on a host 362 may be aware of the IP addresses of the VMs 366 on the host. A local network of virtualized service provider 300 may be configured to route packets from the VMs 366 to Internet destinations (e.g., to service client(s) 390 of virtualized service customer 350), and from Internet sources (e.g., service client(s) 390) to the VMs 366.

Virtualized service provider 300 may provide virtual service customer 340, coupled to global network 200 via local network 356, the ability to implement virtual computing systems 392 via a hardware virtualization service 360 coupled to global network 200 and to the local network of virtualized service provider 300. In some embodiments, hardware virtualization service 360 may provide an interface, for example a web services interface, via which service client 390 may access functionality provided by the hardware virtualization service 360. At the virtual service provider 300, each virtual computing system 392 may represent a virtual machine (VM) 366 on a host 362 system that is leased, rented, or otherwise provided to virtual service customer 350.

From an instance of a virtual computing system 392, a user may access the functionality of virtualized data store service 312 as previously described. Thus, embodiments of a virtualized system as illustrated in FIG. 3C may allow a client to create local instances of virtual computing systems implemented on VMs provided by the a virtualized system provider, and to access data from and store data to a virtual data store implemented by the virtualized system provider from the local instances of the virtual computing systems. As previously described, a virtualized data store gateway 352 may be provided at the virtualized service client 352 that locally caches at least some data, for example frequently accessed or critical data, and that communicates with virtualized data store service 312 via one or more high-bandwidth communications channels to upload new or modified data from the local cache so that the primary store of data (the virtualized data store 316) is maintained.

Data Deduplication Technique in Virtualized Data Store Systems

Embodiments of a data deduplication technique are described that may, for example, be applied in virtualized data store systems as described above to reduce or eliminate redundant data in virtualized data stores. In embodiments of the data deduplication technique, instead of maintaining a fingerprint dictionary and determining data units to be uploaded to the virtualized data store at the virtualized data store customer (the sender), the fingerprint dictionary is maintained at the virtualized data store provider (the receiver), and determining data units to be uploaded is performed at the virtualized data store provider.

Figure 4A:
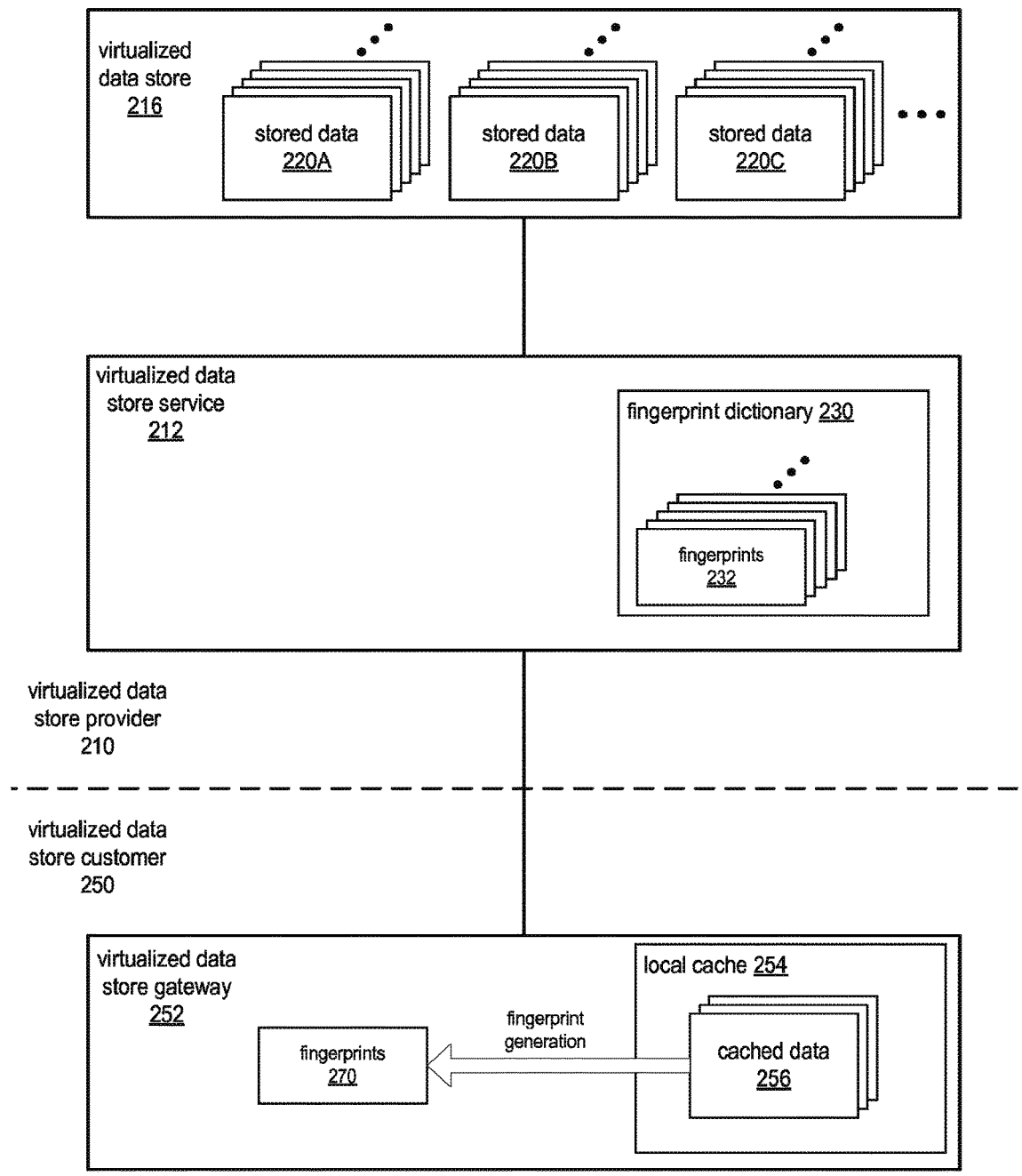
FIGS. 4A through 4F are block diagrams that illustrate the data deduplication technique implemented in a virtualized data store system that includes a virtualized data store gateway at the virtualized data store customer, according to at least some embodiments.

FIGS. 4A through 4F are block diagrams that illustrate the data deduplication technique implemented in a virtualized data store system that includes a virtualized data store gateway at the virtualized data store customer, according to at least some embodiments. It is noted that these Figures are given by way of example; embodiments of the data deduplication technique may be applied in any data storage system that includes a sender (data source) and receiver (data store). Referring to FIG. 4A, the receiver, virtualized data store provider 210 may store data 220 in virtualized data store 216 for one or more virtualized data store customers 250. Virtualized data store provider 210 may provide a virtualized data store service 212. Virtualized data store service 212 may provide an interface, for example a web services interface, via which a virtualized data store customer 250 may access functionality provided by the service 212.

Virtualized data store service 212 may store fingerprints 232 for data 220 stored in virtualized data store 216 in a fingerprint dictionary 230. In at least some embodiments, a fingerprint 232 may be a hash of a unit of data 220. In at least some embodiments, a fingerprint 232 may be any type of cryptographlically strong one-way hash function, for example a Secure Hash Algorithm (SHA)-256 hash function. The use of a cryptographically strong one-way hash function provides security, and helps to avoid collisions, as collisions using such a hash function are highly unlikely. A collision is when two units of data produce the same fingerprint. In block-based data systems (also referred to as block storage systems), a unit of data may, for example, be a 256 k-byte portion of a data block, a 1024 k-byte portion of a data block, or some other fixed or variable sized portion of a data block. In file-based systems, a unit of data may be a file, or a portion of a file similar to the portions in a block-based data system.

Fingerprint dictionary 230 may reside on a single system, or may be distributed across two or more systems, for example two or more server systems. In some embodiments, fingerprint dictionary 230 may be implemented and maintained as a consistent hash dictionary spread across two or more servers at virtualized data store service 212. In at least some embodiments, fingerprint dictionary 230 may be a fixed size dictionary.

In at least some embodiments, virtualized data store service 212 may maintain fingerprints 232 for multiple customers 250 in a single fingerprint dictionary 230. A customer is the "owner" of a particular collection of data, and may be an individual, an enterprise, or a division, department, office, or other entity within an enterprise. In some embodiments, each customer 250 may be assigned a unique client identifier that may be appended to, or otherwise associated with, fingerprints 232 for the respective customer's data. Alternatively, virtualized data store service 212 may maintain a separate fingerprint dictionary 230 for each customer 250.

Virtualized data store gateway 252 may act as an interface between virtualized data store customer 250 and virtualized data store service 212. Virtualized data store gateway 252 may be implemented in hardware, software, or a combination thereof. Some embodiments of virtualized data store gateway 252 may be implemented as a dedicated device or appliance at virtualized data store customer 250 that couples to a local network of virtualized data store customer 250 and also couples to a global network, such as the Internet; the device or appliance may include software and/or hardware that performs various functionality of the gateway 252. Alternatively, virtualized data store gateway 252 may be implemented as a virtual device or appliance on one or more server systems at the virtualized data store customer 250 data center. The coupling to the global network will generally be a high-bandwidth connection, as large amounts of data may need to be transferred across the global network between virtualized data store service 212 and virtualized data store gateway 252.

Rather than retrieving data from virtualized data store 216 on demand, large blocks or chunks of data, even entire volumes of data, may be locally cached by virtualized data store gateway 252. Virtualized data store gateway 252 may include physical data storage and/or memory on which a local cache 254 of data 256, for example frequently-accessed data or critical data, may be maintained. Local cache 254 may be implemented in volatile or non-volatile storage or memory, or a combination thereof. Maintaining a local cache 254 of data 256 may generally improve data access times for virtualized data store customer 250 users, since many or most data accesses can be serviced from the local cache 254, rather than retrieving the data from virtualized data store 216 at each access. However, virtualized data store 216 serves as the primary data store for the virtualized data store customer 250; thus, virtualized data store gateway 252 communicates with virtualized data store service 212 via the global network to periodically, aperiodically, or continuously upload new or modified data 256 in local cache 254 to virtualized data store 216.

Virtualized data store gateway 252 may, in at least some embodiments, maintain cached data 256 in relatively large blocks, e.g. 4 megabyte blocks or 10 megabyte blocks, although larger or smaller block sizes may be used. When a block of data 256 is accessed by a user or process, e.g. to create new data or modify existing data, the block may be marked as "dirty." However, the access may have changed only a small portion of the block. Thus, as shown in FIG. 4A, the virtualized data store gateway 252 may generate fingerprints 270 for units of the dirty block, for example by applying a hash function to each unit. In block-based data systems (also referred to as block storage systems), a unit of data may, for example, be a 256 k-byte portion of a data block, a 1024 k-byte portion of a data block, or some other fixed or variable sized portion of a data block. (In file-based systems, a unit of data may be a file, or a portion of a file similar to the portions in a block-based data system.)

Figure 4B:
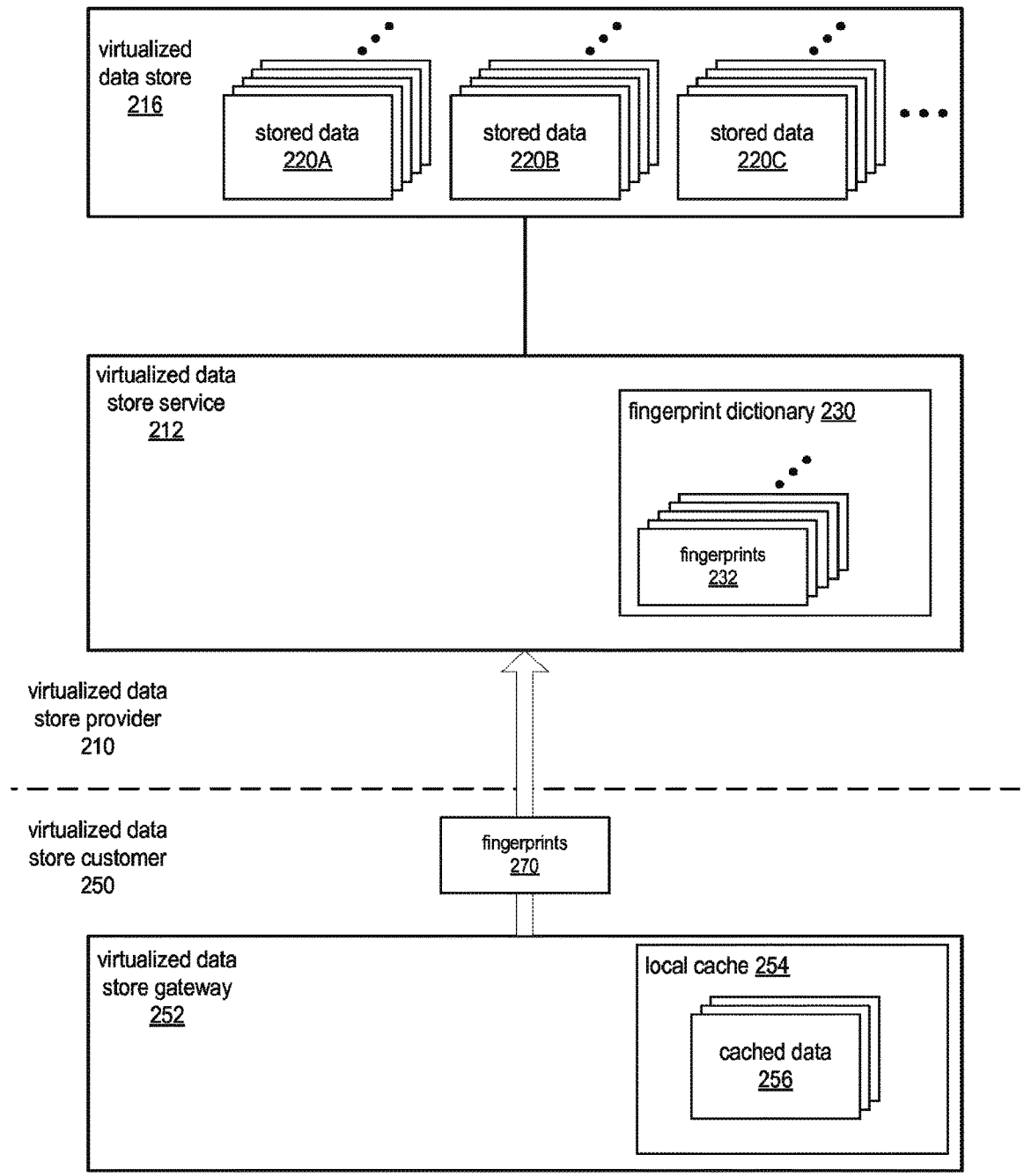

In FIG. 4B, the virtualized data store gateway 252 may send the fingerprints 270 that were generated for the dirty block to the virtualized data store service 212.

Figure 4C:
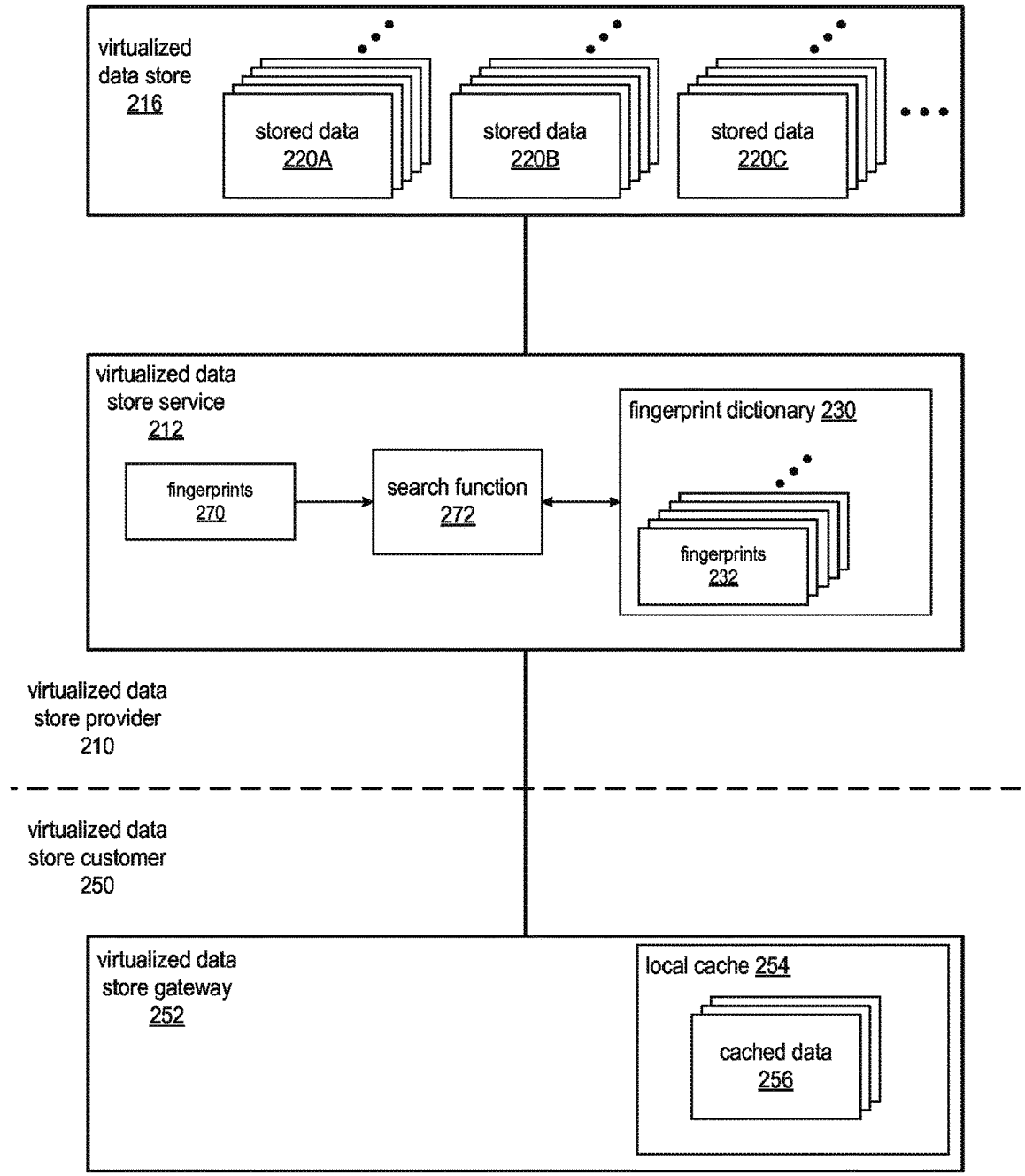

In FIG. 4C, the virtualized data store service 212 may search the fingerprint dictionary 230 for matches to the fingerprints 270 received from the virtualized data store gateway 252. The search may be performed according to a search function 272 implemented by virtualized data store service 212; one of ordinary skill in the art will recognize that any of a variety of search techniques may be used. As previously mentioned, in some embodiments, a unique identifier for the customer 250 may be used to distinguish these fingerprints 270 from those of other customers 250 to avoid collisions, either by searching a fingerprint dictionary 230 specific to the respective customer 250 or by searching a common fingerprint dictionary 230 for all customers 250 for fingerprints that are indicated, by the unique identifier, as belonging to the respective customer 250. Fingerprints 270 that are found in the fingerprint dictionary 230 do not need to be uploaded, as their presence in the dictionary 230 indicates that the corresponding unit of data exists in virtualized data store 216. Fingerprints 270 that are not found in the fingerprint dictionary 230 do need to be uploaded, as their absence from the dictionary 230 indicates that the corresponding unit of data does not exist in virtualized data store 216 or that the corresponding unit of data has been changed and needs to be replaced or updated.

Note that if the entire block of data for which the fingerprints 270 were generated is a newly created block of data, it may be the case that none of the fingerprints 270 will be found in the fingerprint dictionary 230, and thus all of the corresponding units need to be uploaded to the virtualized data store 216. However, some, or all, of the fingerprints 270 may be found in the fingerprint dictionary 230 if the same units of data exist in other previously uploaded blocks for the customer 250, and thus at least some of the corresponding units may not need to be uploaded to the virtualized data store 216. In other words, two or more blocks of data may share at least some common units in the virtualized data store 216.

Figure 4D:
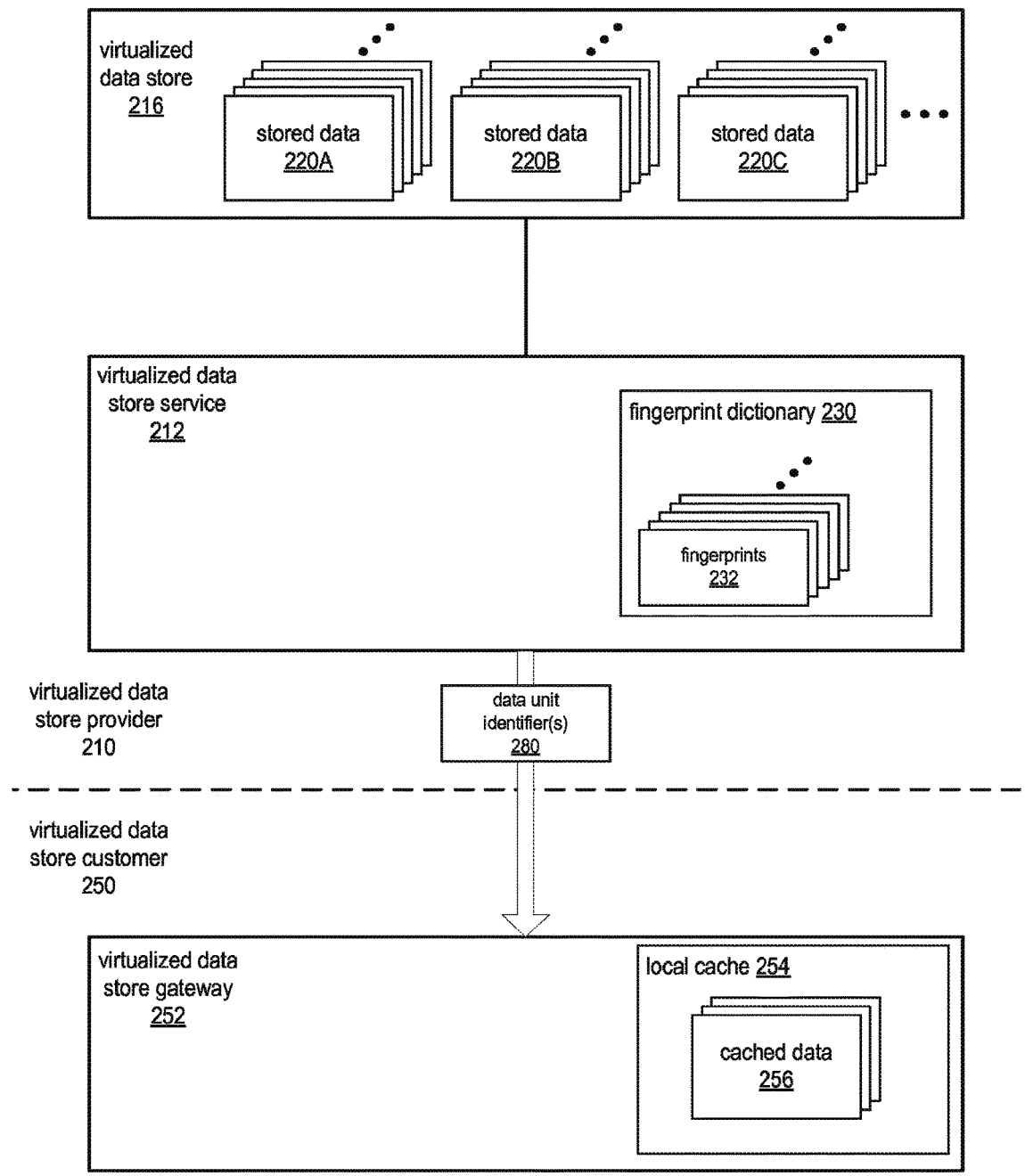

In FIG. 4D, virtualized data store service 212 returns data unit identifier(s) 280 for data units that have been identified as "dirty" (that is, units of data from the data block that need to be uploaded to the virtualized data store 216) to the virtualized data store gateway 252. In some embodiments, the data unit identifiers 280 may be the respective fingerprint(s) 270 of the data units. Other methods may be used to identify data units that need to be uploaded; for example, a block number/unit number indexing scheme may be used to identify data units that need to be uploaded in some embodiments. In some embodiments, a bit field scheme may be used in which one or more bits in a "bit map" are set to indicate either data units that need to be uploaded or data units that do not need to be uploaded. In some embodiments, the data unit identifier(s) 280 sent to virtualized data store gateway 252 by virtualized data store service 212 may indicate the data unit(s) that do not need to uploaded, rather than the data unit(s) that do need to be uploaded. In some embodiments, to reduce bandwidth usage, virtualized data store service 212 may send data unit identifier(s) that indicate either the set of data unit(s) that do not need to uploaded or the set of data unit(s) that do need to be uploaded, depending on which set is the smallest. Information may be included, for example in a header, that indicates whether the identifier(s) sent to virtualized data store gateway 252 are for data unit(s) that do or that do not need to be uploaded.

Figure 4E:
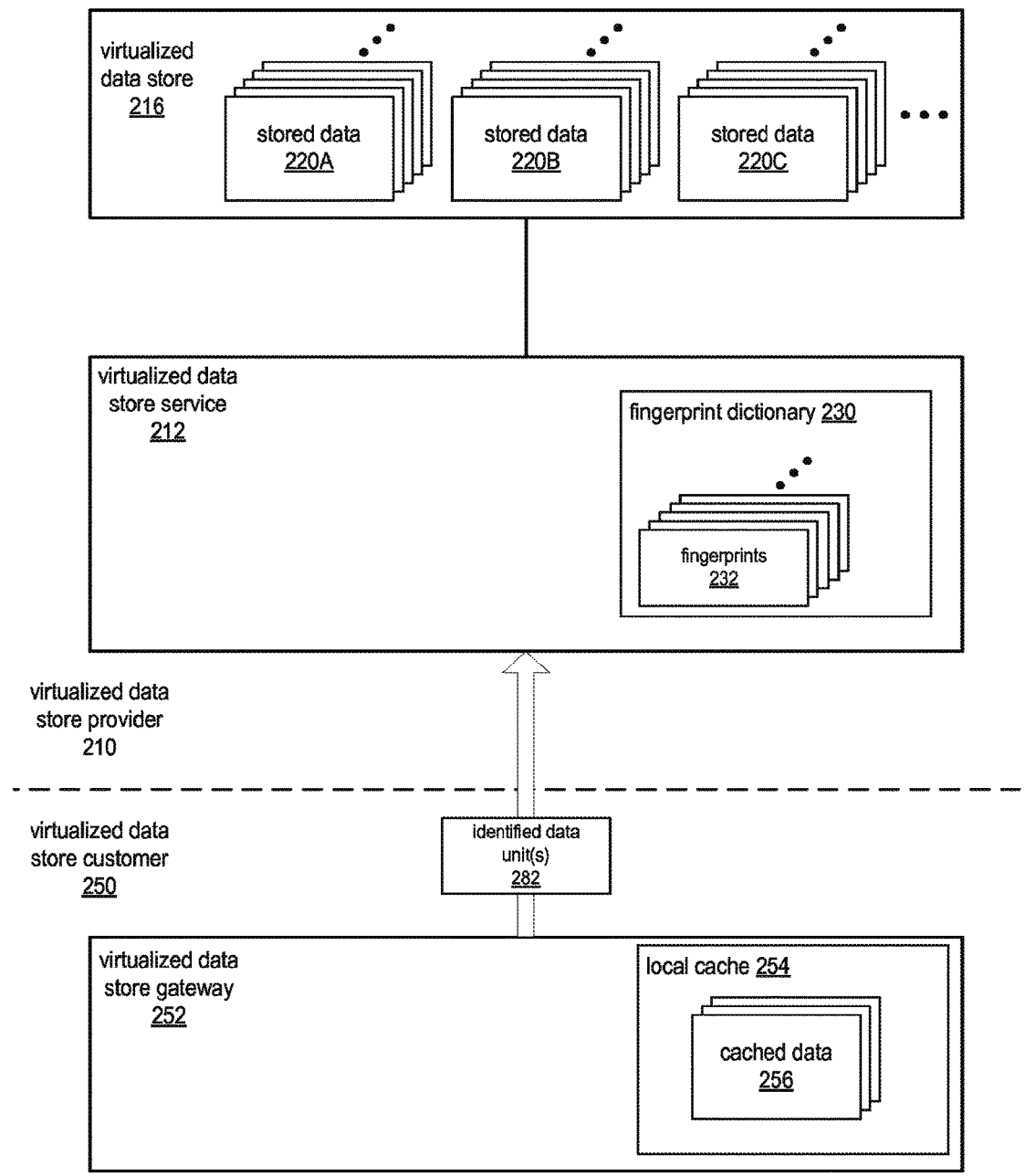

In FIG. 4E, the identified data unit(s) 282 are uploaded from the virtualized data store gateway 252 to the virtualized data store service 212. Note that only the identified data unit(s) from a dirty block are uploaded; the entire block is not uploaded, unless it is the case that all of the data units of the block have been identified by the virtualized data store service 212 as "dirty."

Figure 4F:
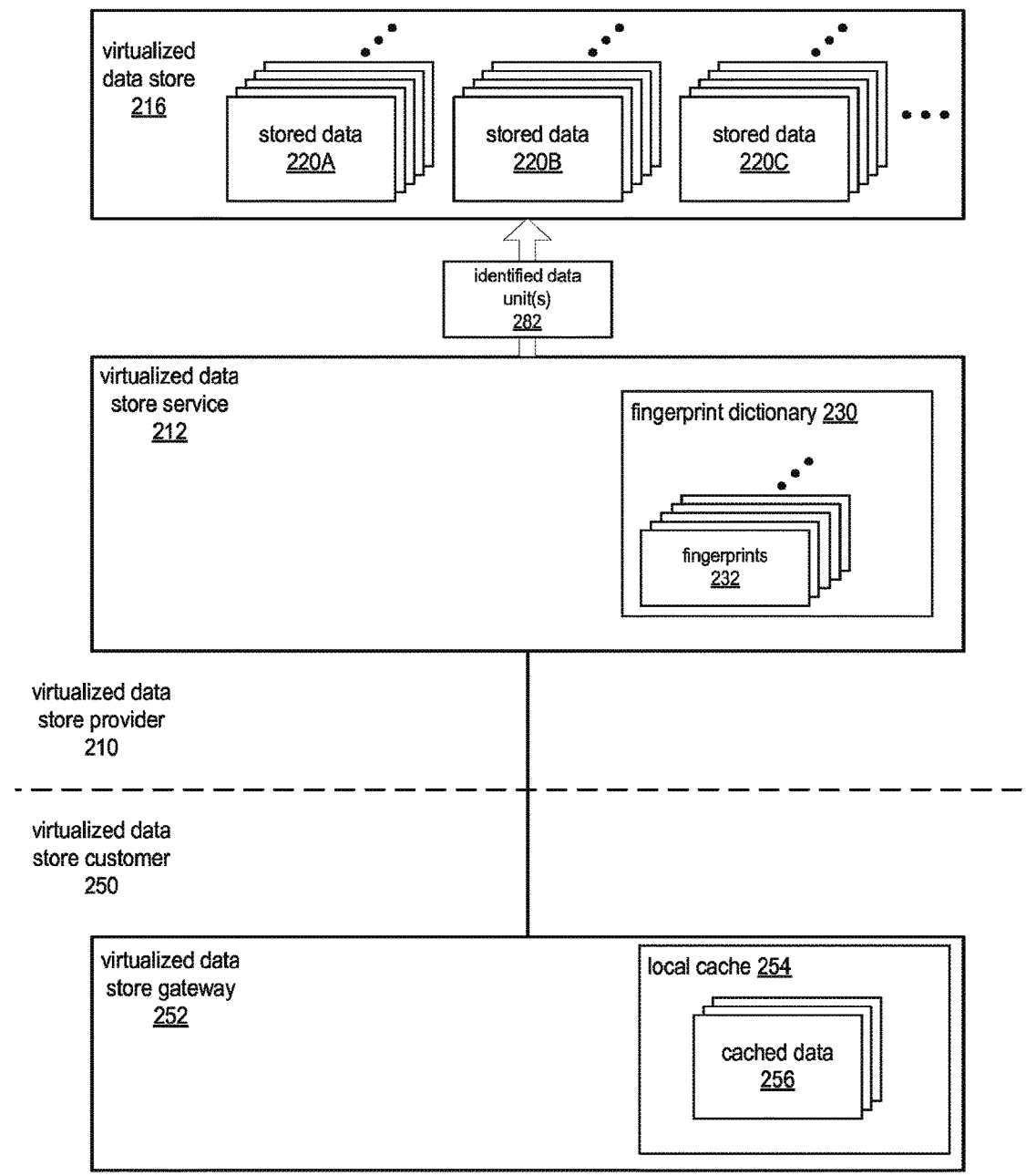

In FIG. 4F, the virtualized data store service 212 stores the identified data unit(s) 282 to the virtualized data store 216. Note that the virtualized data store service 212 may add a given identified data unit 282 as a new data unit in virtualized data store 216, or may replace or update an existing data unit in virtualized data store 216 with a given identified data unit 282.

In some embodiments, identified data units 282 may be compressed by virtualized data store gateway 252 before uploading the data units 282 to the virtualized data store service 212 to further reduce bandwidth usage on the communications channel. In some embodiments, virtualized data store gateway 252 may determine if the compressed version of a given data unit is smaller than the uncompressed version by some threshold amount or percentage, and upload the compressed version if it is, or the uncompressed version if it is not. Compressed data units uploaded to the virtualized data store service 212 may be, but are not necessarily, decompressed before storing to the virtualized data store 216.

As previously noted, in at least some embodiments, fingerprint dictionary 230 may be a fixed size dictionary. Thus, in some embodiments, fingerprint dictionary 230 may not store fingerprints 232 for all data units stored in the virtualized data store 216. Thus, in these embodiments, virtualized data store service 212 may implement one or more dictionary maintenance functions that, periodically or as necessary, purge, delete, or replace fingerprints 232, for example stale or least recently used (LRU) fingerprints 232. Thus, it is possible that one or more of the fingerprints that the virtualized data store service 212 determines are in the dictionary 230 in response to receiving the fingerprints 270 from virtualized data store gateway 252 get purged by a dictionary maintenance function before the exchange in the data deduplication technique is completed. Thus, in some embodiments, after receiving data unit(s) 282 from virtualized data store gateway 252 as shown in FIG. 4E, virtualized data store service 212 may check the received data unit(s) against the fingerprint dictionary 230 to determine if any data units are missing—that is, to determine if any fingerprints 270 that virtualized data store service 212 initially determined were in the dictionary 230 (see FIG. 4C) are no longer in the dictionary 230, and thus the corresponding data units are needed to complete the transaction. In some embodiment, if virtualized data store service 212 determines that additional data units are needed to complete the transaction, the transaction may be restarted—that is, virtualized data store service 212 may request a new list of fingerprints 270 from virtualized data store gateway 252. However, since both virtualized data store service 212 and virtualized data store gateway 252 already have state information for the transaction, in some embodiments, this state information may be leveraged to save bandwidth. In these embodiments, virtualized data store service 212 may, as an additional step in the transaction, send data unit identifier(s) 280 to virtualized data store gateway 252 to request only the data units that are missing; that is, only the data units for which the fingerprints 232 were purged during the transaction.

The process described above in reference to the virtualized data store system of FIGS. 4A through 4F may be a continuing process. That is, virtualized data store gateway 252 may continue to check dirty blocks of data, generate fingerprints for the data units in the blocks, send the fingerprints to virtualized data store service 212, receive back indications of units of data to be uploaded, and upload the indicated units of data to virtualized data store service 212. Virtualized data store service 212 maintains the fingerprint dictionary 230 to reflect the current state of virtualized data store 216, and stores or updates data blocks in virtualized data store 216 according to the data units received from virtualized data store gateway(s) 252.

Figure 5:
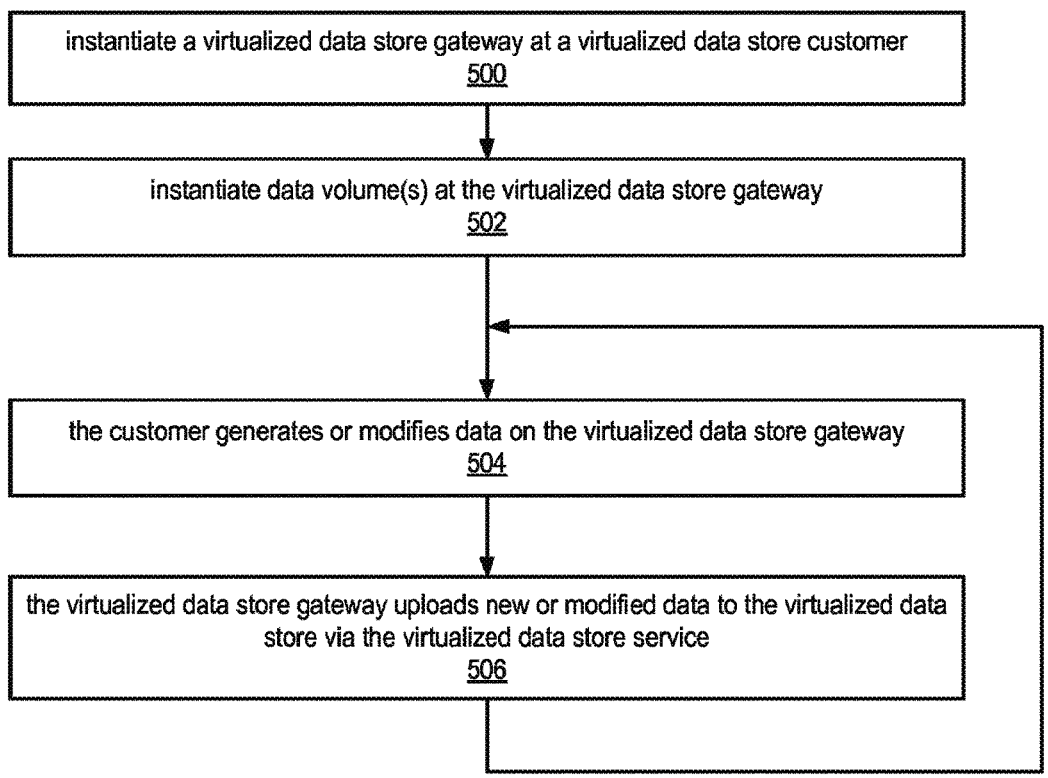
FIG. 5 is a flowchart of a method for initializing a virtualized data store gateway, according to at least some embodiments.

FIG. 5 is a flowchart of a method for initializing a virtualized data store gateway, according to at least some embodiments. As indicated at 500, a virtualized data store gateway may be instantiated at a virtualized data store customer. Some embodiments of virtualized data store gateway may be implemented as a dedicated device or appliance that couples to a local network of the virtualized data store customer data center and also couples to global network (e.g., the Internet); the device or appliance may include software and/or hardware that performs various functionality of the gateway. Alternatively, the virtualized data store gateway may be implemented as a virtual device or appliance on one or more server systems at the virtualized data store customer data center.

As indicated at 502, a user or users may instantiate data volume(s) on the virtualized data store gateway. At 504, the customer generates or modifies data in the volume(s) on the virtualized data store gateway. For example, a user on a client device may create a volume from a client device, mount the volume on the desktop of the client device, and create new data on the volume from the client device.

Figure 6:
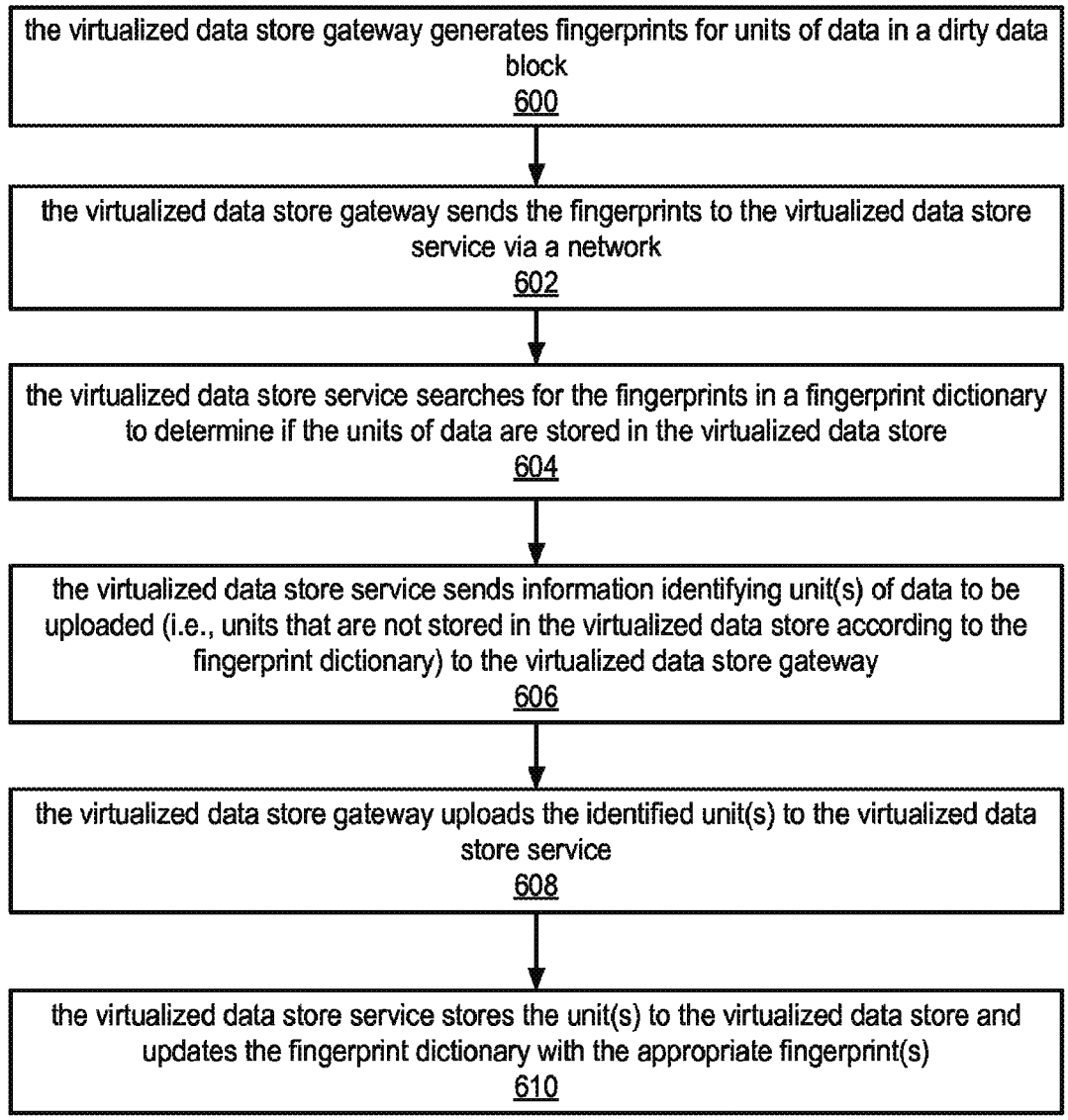
FIG. 6 is a flowchart of a data deduplication technique implemented in a virtualized data store system that includes a virtualized data store gateway, according to at least some embodiments.

As indicated at 506, the virtualized data store gateway uploads new or modified data (i.e., "dirty" data) to the virtualized data store via the virtualized data store service. The uploading of data is performed according to the data deduplication technique, for example as illustrated in FIG. 6, so that the virtualized data store service stores, maintains, and checks the fingerprint dictionary, and only units of data that need to be uploaded to the virtualized data store are sent to the virtualized data store service. The modification and data deduplication processing of data blocks, and uploading of data units, may be a continuing process; that is, the virtualized data store gateway may continue to process dirty blocks of data and upload units of data from the blocks to the virtualized data store via the virtualized data store service according to the data deduplication technique.

FIG. 6 is a flowchart of a data deduplication technique implemented in a virtualized data store system that includes a virtualized data store gateway, according to at least some embodiments. As indicated at 600, the virtualized data store gateway generates fingerprints for units of data in a dirty data block. As indicated at 602, the virtualized data store gateway sends the fingerprints to the virtualized data store service via a network (e.g., the Internet). As indicated at 604, the virtualized data store service searches for the fingerprints in a fingerprint dictionary to determine if the corresponding units of data are stored in the virtualized data store. As indicated at 606, the virtualized data store service sends information identifying unit(s) of data to be uploaded (i.e., units that are not stored in the virtualized data store according to the fingerprint dictionary) to the virtualized data store gateway. In some embodiments, the information identifying unit(s) of data to be uploaded may indicate the data unit(s) that need to uploaded. In some embodiments, the information identifying unit(s) of data to be uploaded may indicate the data unit(s) that do not need to uploaded, rather than the data unit(s) that do need to be uploaded. In some embodiments, to reduce bandwidth usage, the virtualized data store service may send information that indicates either the set of data unit(s) that do not need to uploaded or the set of data unit(s) that do need to be uploaded, depending on which set is the smallest. In some embodiments, a bit field scheme may be used in which one or more bits in a "bit map" are set to indicate either data units that need to be uploaded or data units that do not need to be uploaded. As indicated at 608, the virtualized data store gateway uploads the identified unit(s) to the virtualized data store service via the network. In some embodiments, at least some of the data units may be compressed at the virtualized data store gateway prior to uploading to the virtualized data store service. As indicated at 610, the virtualized data store service stores the unit(s) to the virtualized data store and updates the fingerprint dictionary with the appropriate fingerprint(s).

In at least some embodiments, the fingerprint dictionary may be a fixed size dictionary. In these embodiments, the virtualized data store service may implement one or more dictionary maintenance functions that, periodically or as necessary, purge, delete, or replace fingerprints. Thus, it is possible that one or more of the fingerprints that the virtualized data store service determines are in the dictionary as indicated at 604 of FIG. 6 in response to receiving the fingerprints from the virtualized data store gateway as indicated at 604 of FIG. 6 get purged by a dictionary maintenance function before the exchange in the data deduplication technique is completed. Thus, in some embodiments, after receiving data unit(s) from the virtualized data store gateway, the virtualized data store service may check the received data unit(s) against the fingerprint dictionary to determine if any fingerprints that the virtualized data store service initially determined were in the dictionary are no longer in the dictionary, and thus may determine that the corresponding data units are needed to complete the transaction. In some embodiment, if the virtualized data store service determines that additional data units are needed to complete the transaction, the virtualized data store service may request a new list of fingerprints from virtualized data store gateway to restart the process. However, since both the virtualized data store service and the virtualized data store gateway already have state information for the transaction, in some embodiments, this state information may be leveraged to save bandwidth. In these embodiments, the virtualized data store service may, as an additional step in the method, send data unit identifier(s) to the virtualized data store gateway to request only the data units that are missing; that is, only the data units for which the fingerprints were purged during the transaction. The virtualized data store gateway may then upload the additionally requested data units, and the virtualized data store service may process the additional data units accordingly.

Illustrative System

Figure 7:
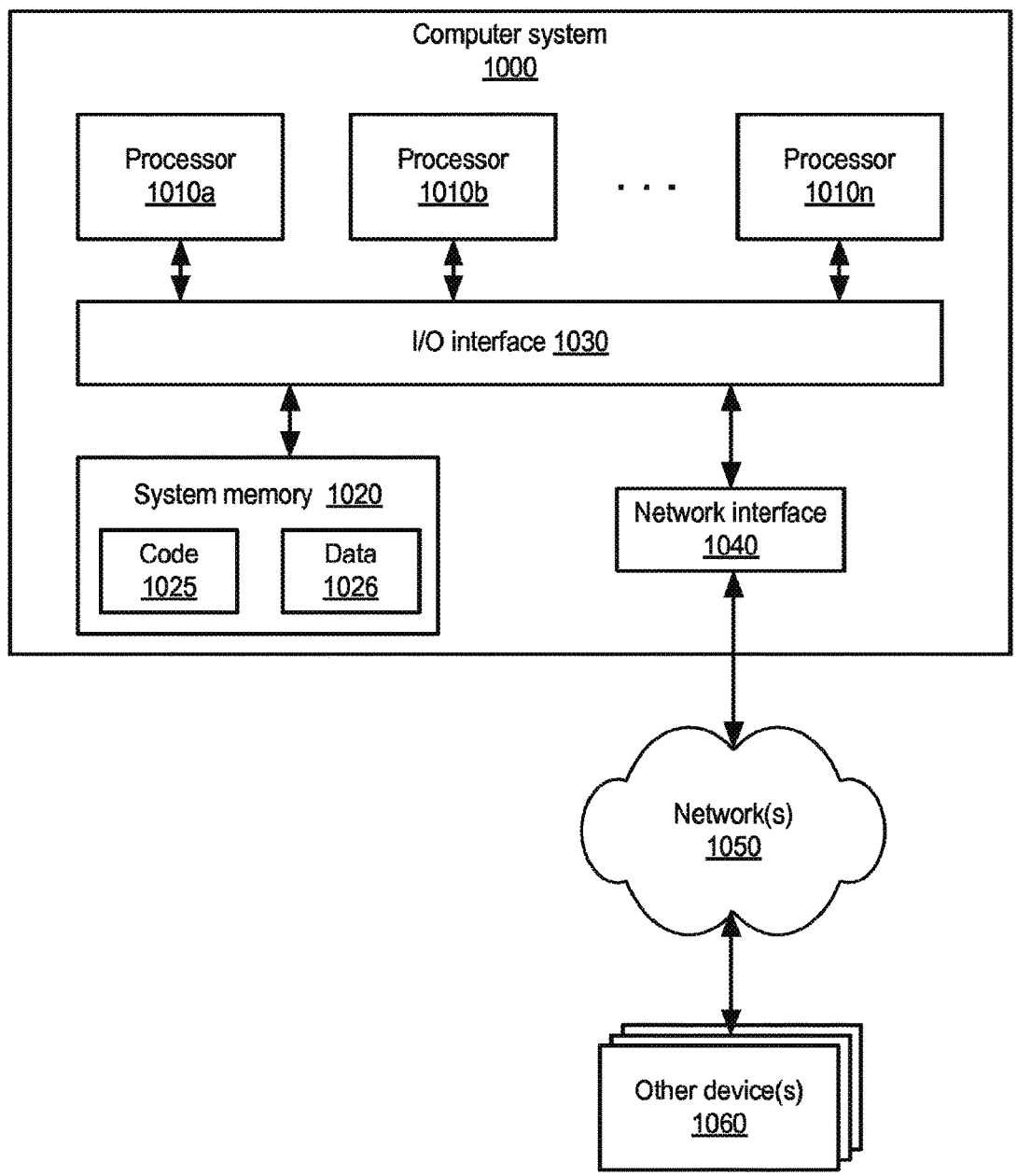
FIG. 7 is a block diagram illustrating an example computer system that may be used in some embodiments.

In at least some embodiments, a server that implements a portion or all of one or more of the technologies, including but not limited to the data storage system technologies and data deduplication technologies as described herein, may include a general-purpose computer system that includes or is configured to access one or more computer-accessible media, such as computer system 1000 illustrated in FIG. 7. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for data storage system technologies and data deduplication technologies, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIGS. 2 through 4F, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 2 through 6 for implementing embodiments of data storage system technologies and data deduplication technologies. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   at least one processor; and
   a memory comprising program instructions, wherein the program instructions are executable by the at least one processor to implement a remote multi-tenant data store service configured to:
      store data for two or more clients to a data store of the remote multi-tenant data store service that is remote from the two or more clients, wherein each of the two or more clients are located on respective client sites;
      store fingerprints to a fingerprint dictionary of the remote multi-tenant data store service, wherein respective fingerprints in the fingerprint dictionary uniquely identify respective data units of data stored in the data store at the multi-tenant data store service;
      receive, from a gateway device via a network, at least one fingerprint corresponding to a respective data unit of a data volume, wherein the gateway device is located at a client site of a given one of the two or more clients, and wherein the data volume is generated or modified on the gateway device by a client device at the client site of the given client;
      search the fingerprint dictionary for the at least one fingerprint to determine whether the fingerprint is in or is not in the fingerprint dictionary, wherein determining that the fingerprint is not in the fingerprint dictionary indicates the corresponding data unit is to be uploaded;
      send, to the gateway device via the network, an indication of one or more data units to be uploaded as determined by said search; and
      receive, from the gateway device via the network, the indicated one or more data units to store at the multi-tenant data store service.

2. The system as recited in claim 1, wherein each fingerprint is a hash of a respective data unit.

3. The system as recited in claim 2, wherein the hash is generated according to a cryptographically strong one-way hash function applied to the respective data unit.

4. The system as recited in claim 1, wherein the multi-tenant data store service is further configured to update the fingerprint dictionary with the fingerprint corresponding to each data unit received from the gateway device and stored to the multi-tenant data store service.

5. The system as recited in claim 1, wherein the data is stored at the multi-tenant data store service as data blocks, and wherein each data block comprises two or more data units.

6. The system as recited in claim 1, wherein the program instructions are executable by the at least one processor to provide the multi-tenant data store service as a virtualized data store to a plurality of customers via the network, wherein the data stored in the data store includes customer data for each of the plurality of customers, and wherein the gateway device locally caches at least a portion of the customer data of the respective customer from the data store.

7. The system as recited in claim 1, wherein the indication of one or more data units to be uploaded indicates data units for which a fingerprint was not found in the fingerprint dictionary by said search.

8. A method, comprising:
   performing, by a remote multi-tenant data store service implemented on one or more computing devices:
      storing data for two or more clients to a data store of the remote multi-tenant data store service that is remote from the two or more clients, wherein each of the two or more clients are located on respective client sites;
      storing fingerprints for data stored in the data store to a fingerprint dictionary of the remote multi-tenant data store service, wherein the data comprises a plurality of data units, and wherein each fingerprint in the fingerprint dictionary uniquely identifies a respective data unit in the data stored in the data store;
      receiving, from a device via a network, one or more fingerprints each corresponding to a different data unit of a data volume, wherein the device is located at a client site of a given one of the two or more clients, the client site being remote from the multi-tenant data store service, and wherein the data volume is generated or modified on the device by a client device at the client site of the given client;
      searching the fingerprint dictionary for each of the one or more fingerprints received from the device to determine whether the fingerprint is in or is not in the fingerprint dictionary, wherein determining that a fingerprint is not in the fingerprint dictionary indicates a corresponding data unit to be uploaded;
      sending, to the device via the network, an indication of one or more data units to be uploaded as determined by said searching the fingerprint dictionary;
      receiving, from the device via the network, the indicated one or more data units, wherein each received data unit corresponds to a fingerprint that is not in the fingerprint dictionary; and
      storing the one or more data units received from the device to the data store.

9. The method as recited in claim 8, wherein each fingerprint is a hash of a respective data unit.

10. The method as recited in claim 9, wherein the hash is generated according to a cryptographically strong one-way hash function applied to the respective data unit.

11. The method as recited in claim 8, further comprising updating the fingerprint dictionary with fingerprints corresponding to the one or more data units received from the device and stored to the data store.

12. The method as recited in claim 8, wherein the multi-tenant data store service is configured to provide the data store as a virtualized data store to two or more clients via the network.

13. The method as recited in claim 8, further comprising:
associating a client identifier with each of two or more clients of the multi-tenant data store service; and
wherein said searching the fingerprint dictionary for each of the one or more fingerprints received from the device comprises searching only among the fingerprints corresponding to a given client according to the client identifier of the given client.

14. The method as recited in claim 8, further comprising:
after said receiving the indicated one or more data units from the device, determining that at least one fingerprint that said searching indicated was in the fingerprint dictionary has subsequently been deleted from the fingerprint dictionary;
in response to said determining, sending, to the device via the network, an indication of at least one data unit corresponding to the at least one fingerprint; and
receiving, from the device via the network, the indicated at least one data unit.

15. A non-transitory computer-accessible storage medium storing program instructions that when executed by one or more computers implement a remote multi-tenant data store service configured to:
store data for two or more clients to a data store of the remote multi-tenant data store service that is remote from the two or more clients, wherein each of the two are more clients are located on respective client sites;
store fingerprints for data stored in the data store to a fingerprint dictionary of the remote multi-tenant data store service, wherein the data comprises a plurality of data units, and wherein each fingerprint in the fingerprint dictionary uniquely identifies a respective data unit in the data stored in the data store;
receive, from a device via a network, one or more fingerprints each corresponding to a different data unit of a data volume, wherein the device is located at a client site of a given one of the two or more clients, the client site being remote from the multi-tenant data store service, and wherein the data volume is generated or modified on the device by a client device at the client site of the given client;
search the fingerprint dictionary for each of the one or more fingerprints received from the device to determine whether the fingerprint is in or is not in the fingerprint dictionary, wherein determining that a fingerprint is not in the fingerprint dictionary indicates a corresponding data unit to be uploaded;
send, to the device via the network, an indication of one or more data units to be uploaded as determined by said search of the fingerprint dictionary;
receive, from the device via the network, the indicated one or more data units, wherein each received data unit corresponds to a fingerprint that is not in the fingerprint dictionary; and
store the one or more data units received from the device to the data store.

16. The non-transitory computer-accessible storage medium as recited in claim 15, wherein each fingerprint is a hash of a respective data unit.

17. The non-transitory computer-accessible storage medium as recited in claim 16, wherein the hash is generated according to a cryptographically strong one-way hash function applied to the respective data unit.

18. The non-transitory computer-accessible storage medium as recited in claim 15, wherein the multi-tenant data store service is further configured to update the fingerprint dictionary with the fingerprint corresponding to each data unit received from the device.

19. The non-transitory computer-accessible storage medium as recited in claim 15, wherein the data comprises a plurality of data blocks, and wherein each data block comprises two or more of the plurality of data units.

20. The non-transitory computer-accessible storage medium as recited in claim 15, wherein the multi-tenant data store service is configured to provide the data store as a virtualized data store to two or more clients of the multi-tenant data store service via the network.

* * * * *